(12) United States Patent
Tseng et al.

(10) Patent No.: US 10,276,885 B2
(45) Date of Patent: Apr. 30, 2019

(54) PROTON EXCHANGE MEMBRANE AND MANUFACTURING METHOD THEREOF

(71) Applicant: NATIONAL TSING HUA UNIVERSITY, Hsinchu (TW)

(72) Inventors: Fan-Gang Tseng, Taipei (TW); Pen-Cheng Wang, Hsinchu (TW); Yu-Ting Chiu, Taoyuan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 307 days.

(21) Appl. No.: 15/097,015

(22) Filed: Apr. 12, 2016

(65) Prior Publication Data
US 2017/0187058 A1 Jun. 29, 2017

(30) Foreign Application Priority Data

Dec. 24, 2015 (TW) .............................. 104143558 A

(51) Int. Cl.
| | |
|---|---|
| *H01M 8/1004* | (2016.01) |
| *H01M 8/1058* | (2016.01) |
| *H01M 8/106* | (2016.01) |
| *H01M 8/1072* | (2016.01) |
| *H01M 8/1088* | (2016.01) |
| *H01M 8/1018* | (2016.01) |

(52) U.S. Cl.
CPC ......... *H01M 8/1004* (2013.01); *H01M 8/106* (2013.01); *H01M 8/1058* (2013.01); *H01M 8/1074* (2013.01); *H01M 8/1088* (2013.01); *H01M 2008/1095* (2013.01); *Y02P 70/56* (2015.11)

(58) Field of Classification Search
CPC ............. H01M 8/1004; H01M 8/1088; H01M 8/1074; H01M 8/106; H01M 8/1058; H01M 2008/1095; Y02P 70/56
See application file for complete search history.

(56) References Cited

U.S. PATENT DOCUMENTS

| | | | | |
|---|---|---|---|---|
| 2006/0068204 | A1* | 3/2006 | Rasmussen | C08G 83/003 428/407 |
| 2006/0154127 | A1* | 7/2006 | Eritate | H01M 4/8605 429/483 |
| 2007/0048592 | A1* | 3/2007 | Wu | H01M 4/8605 429/494 |
| 2007/0154760 | A1* | 7/2007 | Zhu | C01B 3/02 429/494 |
| 2008/0286628 | A1* | 11/2008 | Briehn | C08K 9/06 429/518 |
| 2010/0040927 | A1* | 2/2010 | Yoshida | C08F 8/00 429/483 |

* cited by examiner

*Primary Examiner* — Muhammad S Siddiquee
(74) *Attorney, Agent, or Firm* — Muncy, Geissler, Olds & Lowe, P.C.

(57) ABSTRACT

A manufacturing method of a proton exchange membrane is provided, which includes the steps as follows. The hydroxyl groups are disposed on the surface of a substrate by a hydrophilic treatment. The hydroxyl groups on the substrate are chemically modified with a coupling agent by a sol-gel process. The substrate is exposed to an amino acid with a phosphonate radical so that the amino acid containing a phosphonate radical can be chemically bonded with the coupling agent. The chemically bonded substrate is immersed in phosphoric acid for absorbing the phosphoric acid. The substrate blended with the phosphoric acid is placed between at least two leak-proof films for the purpose of preventing the leakage of the absorbed phosphoric acid. The proton exchange membrane manufactured by this method enable to retain the phosphoric acid in organic/inorganic complex form and micron/nano complex pore size.

3 Claims, 28 Drawing Sheets

PROTON EXCHANGE MEMBRANE AND MANUFACTURING METHOD THEREOF

CROSS-REFERENCE TO RELATED APPLICATION

This application claims the benefit of Taiwan Patent Application No. 104143558, filed on Dec. 24, 2015, in the Taiwan Intellectual Property Office, the disclosure of which is incorporated herein in its entirety by reference.

BACKGROUND OF THE INVENTION

1. Field of the Invention

The present disclosure generally relates to a proton exchange membrane and manufacturing method thereof, and in particular, to a proton exchange membrane and manufacturing method thereof which is feasible to be applied to the phosphoric acid fuel cell (PAFC).

2. Description of the Related Art

Currently, the energies such as petroleum, electric power, and natural resources, and so on are globally available. The petroleum is conveniently to be used, and the petroleum consumption plays a striking figure in the world energy consumption by 78%. However, the great amount of petroleum consumption causes the considerable carbon emission, resulting that the greenhouse effect and climate change become uncontrollable, and ecocide and eco-catastrophe seem to be inevitable. As a consequence, developing green energy to replace petroleum is in dire need.

Countries have been actively developing the green energies such as hydrogen power, solar power, water power, wind power, and geothermal heat, and so on. The development of hydrogen power is most noticeable. The usage of hydrogen-oxygen fuel cell is highly efficient and eco-friendly because hydrogen gas and oxygen gas are served as fuels for the hydrogen-oxygen fuel cell to generate power and water through the electrochemical reaction. Hence, the hydrogen-oxygen fuel cell attracts attentions. Most PAFCs can be functioned at the temperature between 150 and 210° C. as the phosphoric acid which is anhydrous self-ionization in the temperature range is served as the proton conductor. Compared with the traditional proton exchange membrane fuel cell (PEMFC), the PAFC has following advantages. 1. The platinum catalyst is unease to be poisoned by CO, so that the platinum catalyst's carrying capacity is reduced to save the cost of battery assembly. 2. The technical problem of water management can be solved to simplify the design problem, so that the expenditure on humidifier becomes unnecessary. 3. The usage of energy is promoted. 4. The capacity of reforming gaseous fuel is provided to have a better tolerance for $CO_2$. Nonetheless, the technical problem of PAFC is that the used proton exchange membrane is incapable of retaining the phosphoric acid after a period of time, so that the proton conductivity of the proton exchange membrane decreases and the overall efficiency of PAFC reduces accordingly. As a result, the retention capacity of the phosphoric acid for the proton exchange membrane has to be improved.

SUMMARY OF THE INVENTION

In view of the aforementioned technical problems, the objective of the present disclosure provides a proton exchange membrane which is able to retain the phosphoric acid in organic/inorganic complex form and micron/nano complex pore size to improve the retention capacity for the phosphoric acid.

In view of the aforementioned technical problems, the present disclosure provides a method of manufacturing a proton exchange membrane, which may include the steps as follows: disposing hydroxyl groups on a surface of a substrate by a hydrophilic treatment; chemically modifying the hydroxyl groups disposed on the substrate with a coupling agent by a sol-gel process; chemically bonding an amino acid containing a phosphonate radical with the coupling agent modifying the substrate; the substrate which is chemically bonded absorbing phosphoric acid; and placing the substrate blended with the phosphoric acid between at least two leak-proof films for preventing the leakage of the absorbed phosphoric acid.

Preferably, the substrate may include glass fiber, polybenzimidazoles (PBI), polyolefin, or polyacrylamide/polyvinyl alcohol (PAM/PVA).

Preferably, the coupling agent may include (3-glycidyloxypropyl)trimethoxysilane (GPTMS).

Preferably, the amino acid with a phosphonate radical may include O-phospho-DL-serine, O-phospho-L-threonine, O-phospho-L-tyrosine, or N-phosphonomethylglycine.

Preferably, the least two leak-proof films may include a polytetrafluoroethylene (PTFE) film, a graphene oxide, or a polycarbonate membrane.

The present disclosure further provides a proton exchange membrane, which includes a substrate, a coupling agent, serine with a phosphonate radical, phosphoric acid and at least two leak-proof films. The coupling agent can be chemically modified on the substrate by a sol-gel process. The serine containing a phosphonate radical can be chemically bonded with the coupling agent. The phosphoric acid can be absorbed on the substrate. The substrate blended with the phosphoric acid is placed between the least two leak-proof films for preventing the leakage of the absorbed phosphoric acid.

Preferably, the substrate may include glass fiber, polybenzimidazoles, polyolefin, or polyacrylamide/polyvinyl alcohol.

Preferably, the coupling agent may include (3-glycidyloxypropyl)trimethoxysilane.

Preferably, the serine containing a phosphonate radical may include O-phospho-DL-serine, O-phospho-L-threonine, O-phospho-L-tyrosine, or N-phosphonomethylglycine.

Preferably, the least two leak-proof films may include a polytetrafluoroethylene film, a graphene oxide, or a polycarbonate membrane.

As mentioned previously, a proton exchange membrane provided by the present disclosure is able to retain the phosphoric acid in organic/inorganic complex form to improve the retention capacity of the proton exchange membrane for retaining the phosphoric acid, such that the technical problem concerning the phosphoric acid leaking with time can be improved.

DETAILED DESCRIPTION OF THE PREFERRED EMBODIMENTS

Figure 1:
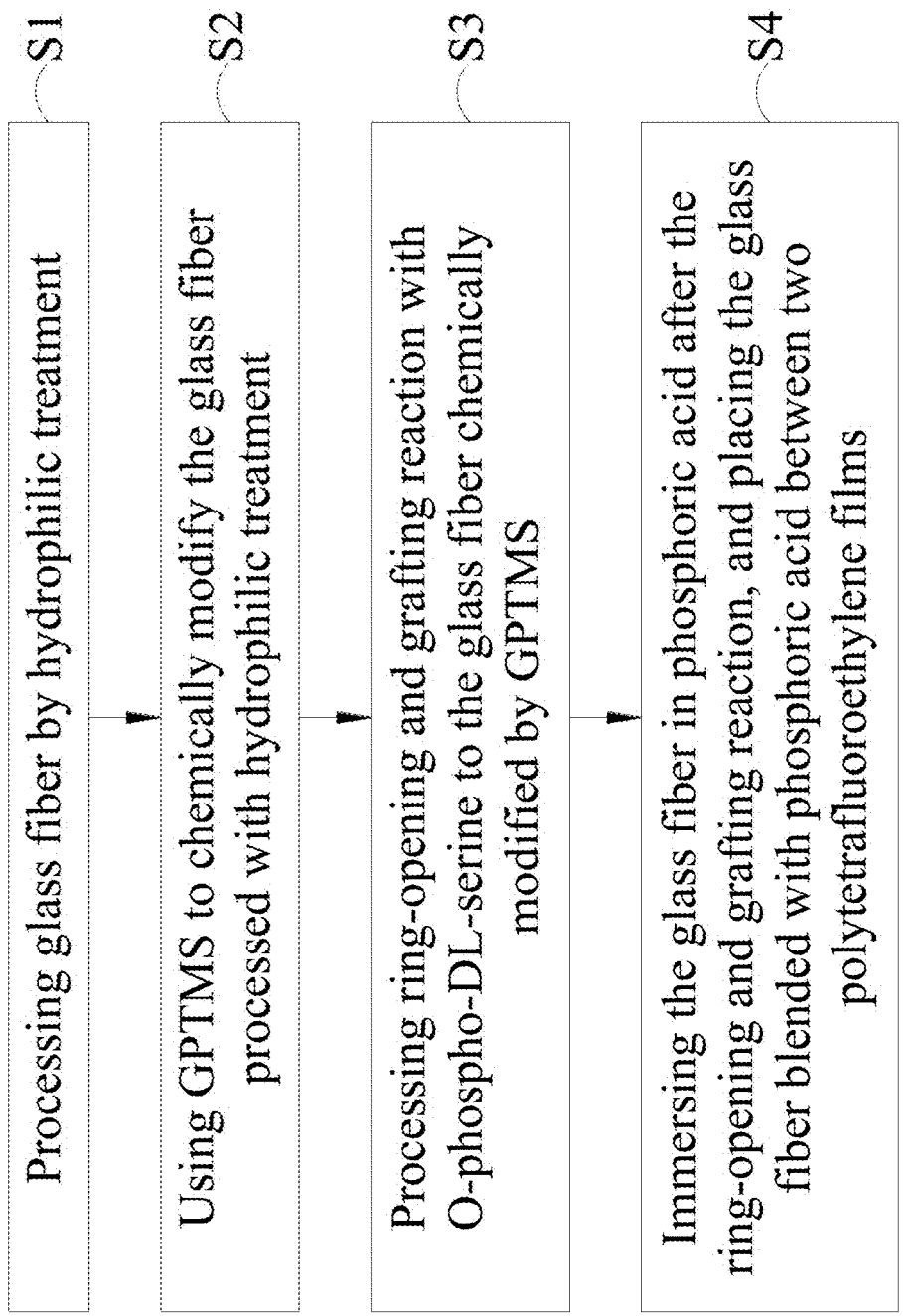
FIG. 1 is a flow chart of an embodiment of a method of manufacturing a proton exchange membrane in accordance with the present disclosure.

Please refer to FIGS. 1, 2A, 2B and 2C, which are flow charts of a method of manufacturing a proton exchange membrane in accordance with the present disclosure. The method of manufacturing a proton exchange membrane is feasible to be applied to all the embodiments of the present disclosure. In the present embodiment, the hydrophilic treatment may include KOH immersion treatment, hydro plasma treatment or methanol immersion treatment, but it shall be not limited thereto. The substrate may be made of glass fiber, polybenzimidazoles, polyolefin, or polyacrylamide/polyvinyl alcohol, but it shall be not limited thereto. The amino acid with a phosphonate radical may include O-phospho-DL-serine, O-phospho-L-threonine, O-phospho-L-tyrosine, or N-phosphonomethylglycine, but it shall be not limited thereto. As shown in FIG. 1, the process may include the following steps.

Figure 2A:
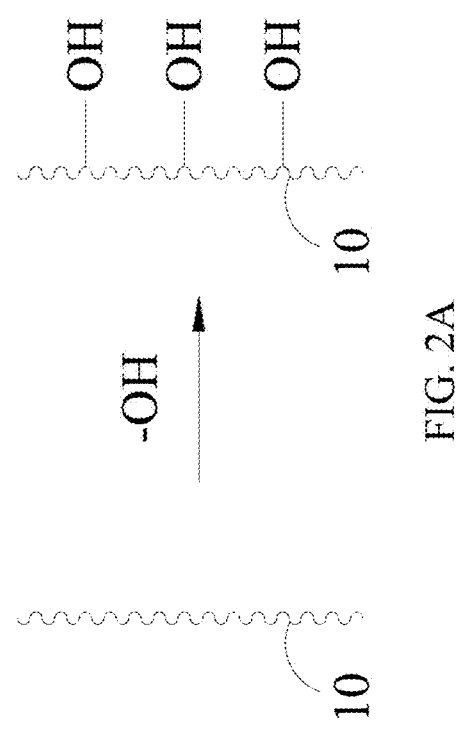
FIG. 2A is a schematic diagram illustrating an embodiment of a proton exchange membrane processed with hydrophilic treatment in accordance with the present disclosure.

Step 1: acetone, isopropanol and deionized water are used to clean a glass fiber 10 through supersonic vibration by 5 minutes, and then the glass fiber 10 is immersed in the potassium hydroxide (KOH) solution of 10% concentration at room temperature through supersonic vibration by 40 minutes, such that the glass fiber 10 is cleaned and has hydrophilic effect. As shown in FIG. 2A, the glass fiber 10 made according to the process mentioned above has hydroxyl groups. The following reaction is shown as follows.

Figure 2B:
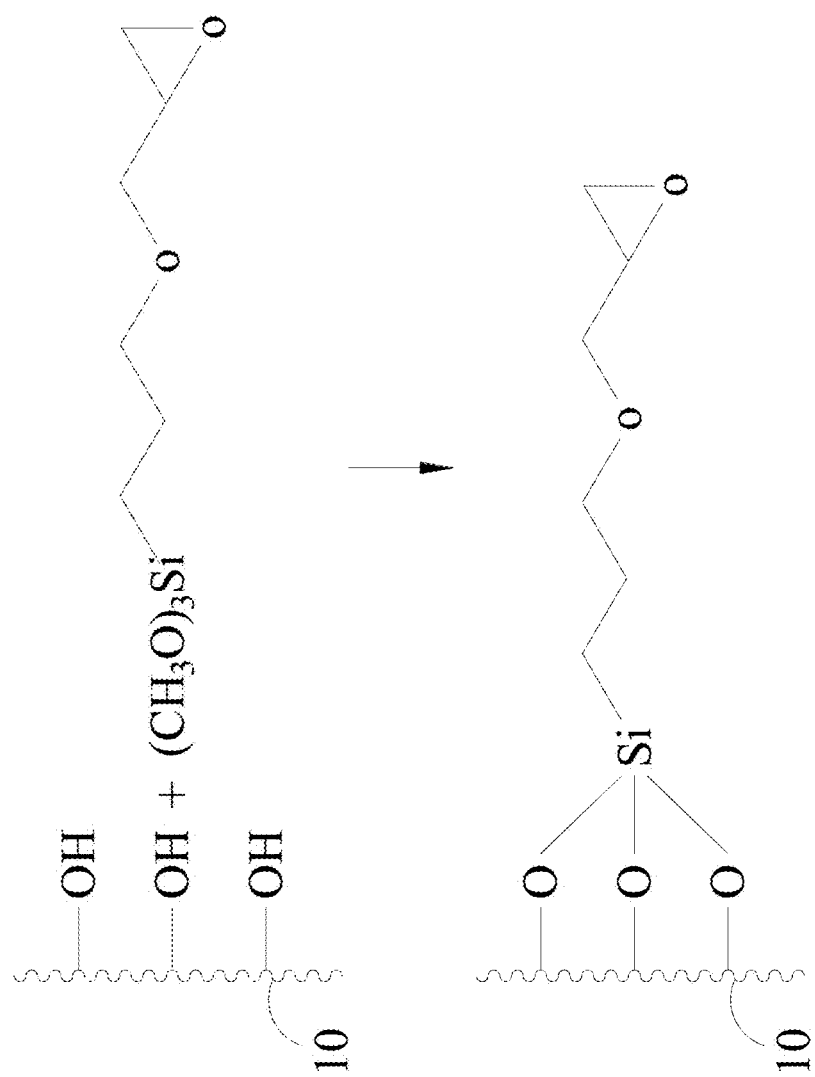
FIG. 2B is a schematic diagram illustrating an embodiment of a proton exchange membrane modified by GPETMS in accordance with the present disclosure.

Step 2: 3-glycidoxypropyl-trimethoxysilane (GPTMS) is disposed on the glass fiber 10 by a sol-gel process. The GPTMS is added dropwise to ethanol to prepare the GPTMS in ethanol solution of 1 vol. %, and then a magnetic stirrer is sued to stir the solution. The addition of acetic acid is used to adjust the PH value of the solution to be 3 to 5, and acid catalysis is used to facilitate the hydrolysis of the GPTMS. The glass fiber 10 processed with hydrophilic treatment is added to the prepared GPTMS solution to perform dehydration reaction by 4 hours. The step facilitates the GPTMS to be disposed on the glass fiber 10, as shown in FIG. 2B.

Figure 2C:
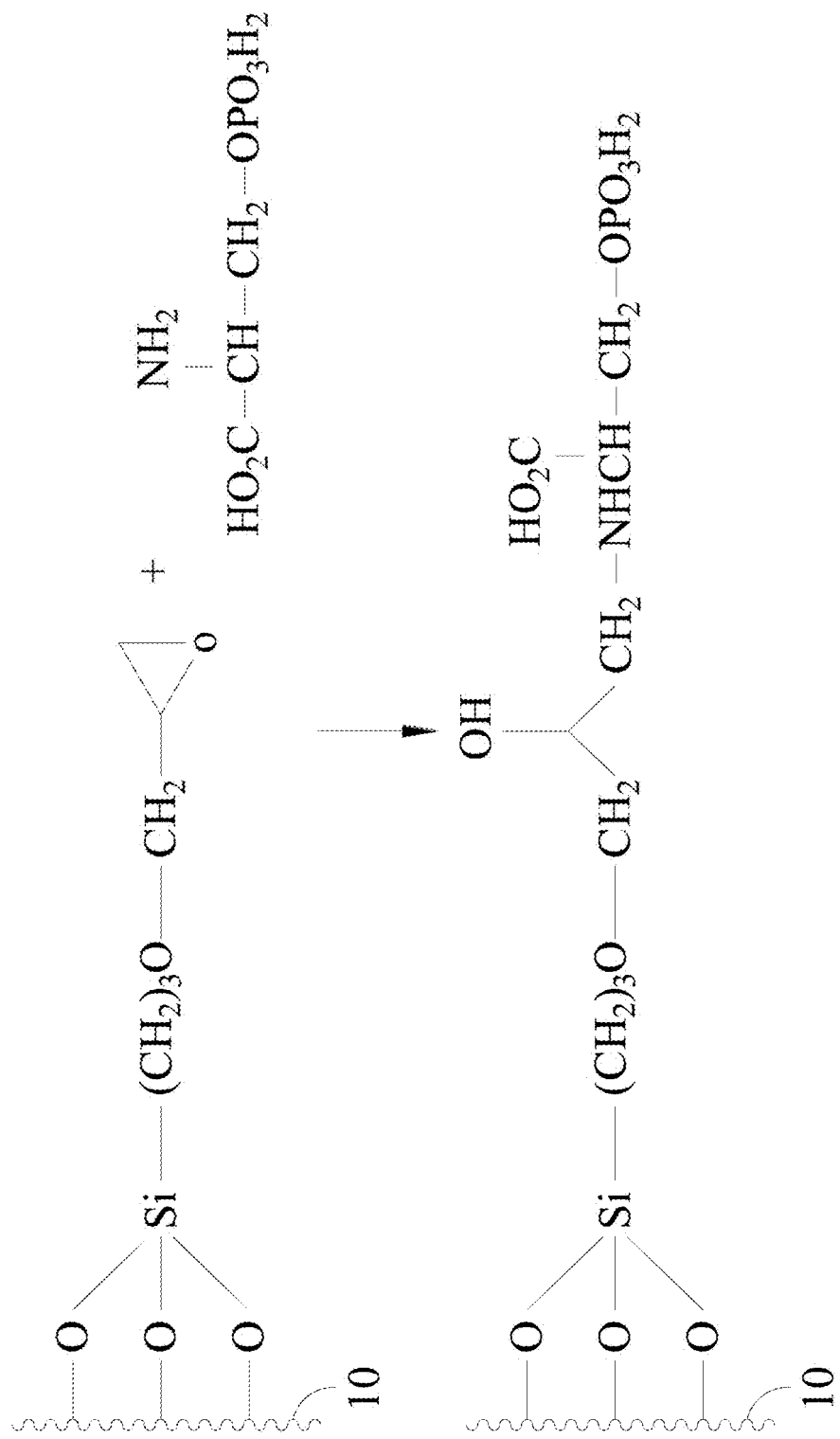
FIG. 2C is a schematic diagram illustrating an embodiment of the ring-opening and grafting reaction of a proton exchange membrane in accordance with the present disclosure.

Step 3: O-phospho-DL-serine of 2 grams is solved in the deionized water with 200 ml at a temperature of 80° C. The glass fiber 10 disposed with the GPTMS is placed in the O-phospho-DL-serine solution at a temperature of 80° C. to react by one hour. The step is to perform the ring-opening and grafting reaction by using epoxy group of the GPTMS and amino group of the O-phospho-DL-serine, so as to achieve the purpose of chemically bonding phosphonate radicals on the glass fiber 10, as shown in FIG. 2C.

Step 4: the prepared glass fiber 10 is immersed in the phosphoric acid of 86% concentration at a temperature of 150° C. by 20 minutes, and baked at a temperature of 60° C. to remove the unwanted water. Afterwards, the glass fiber 10 is placed between two polytetrafluoroethylene films to form the desired proton exchange membrane of the present disclosure. The polytetrafluoroethylene film used herein is to prevent the leakage of the phosphoric acid absorbed by the glass fiber 10.

In accordance with the present embodiment, the proton exchange membrane transfers proton in organic/inorganic complex form. The organic form means that the proton is transferred by the phosphonate radicals chemically bonded (containing C—P bond) on the substrate. The inorganic form is that the proton is transferred through electrolyte such as the phosphoric acid adhered to the substrate by capillary action, Van der Waals force, or hydrogen bond. The organic/inorganic complex form is characterized of better proton conductivity due to the inorganic form and stronger C—P bonding that performs by the organic form. Besides, it can avoid losing electrolyte resulted from the inorganic form. As a result, the defect of the proton conductivity degrading with time can be improved.

The sequence shown in FIG. 1 explains the process of substrate. For example, when the substrate is modified by the GPTMS, that means the substrate has also been processed with the hydrophilic treatment, or when the substrate is processed with ring-opening and grafting reaction, that means the substrate has also been processed by the hydrophilic treatment and modified by the GPTMS, the unnecessary details are no longer provided hereinafter for the concise manner.

Figure 3A:
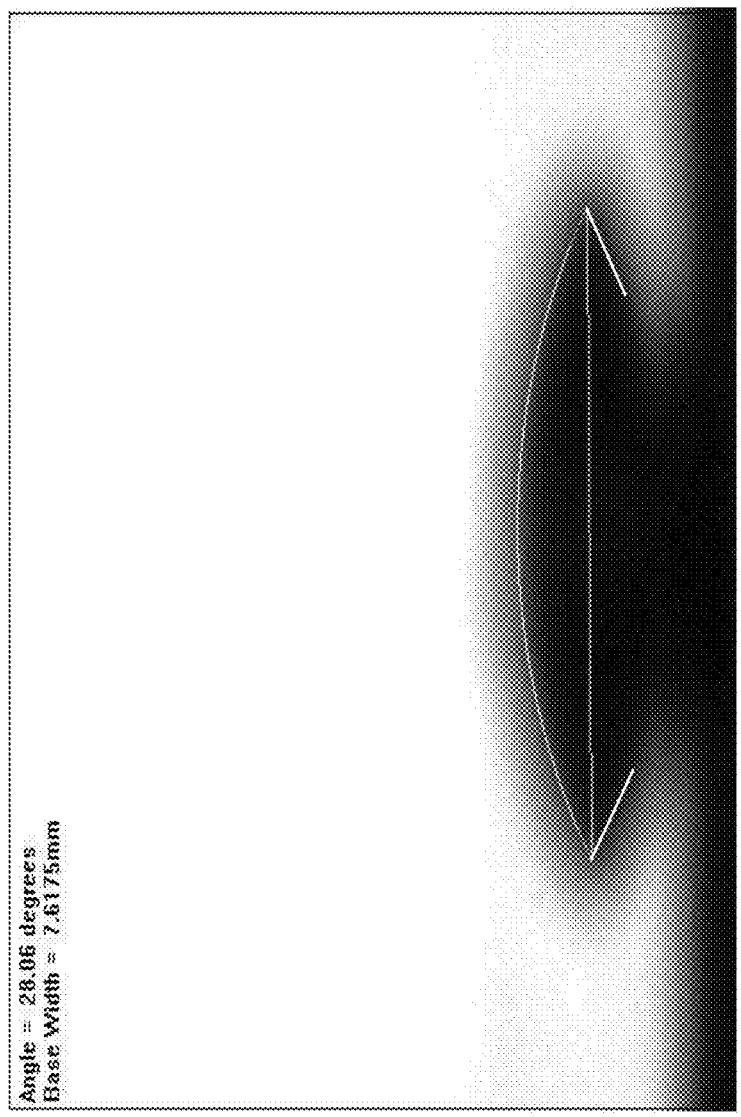
FIG. 3A is a photo showing an embodiment of an unprocessed silicon wafer in accordance with the present disclosure.
Figure 3B:
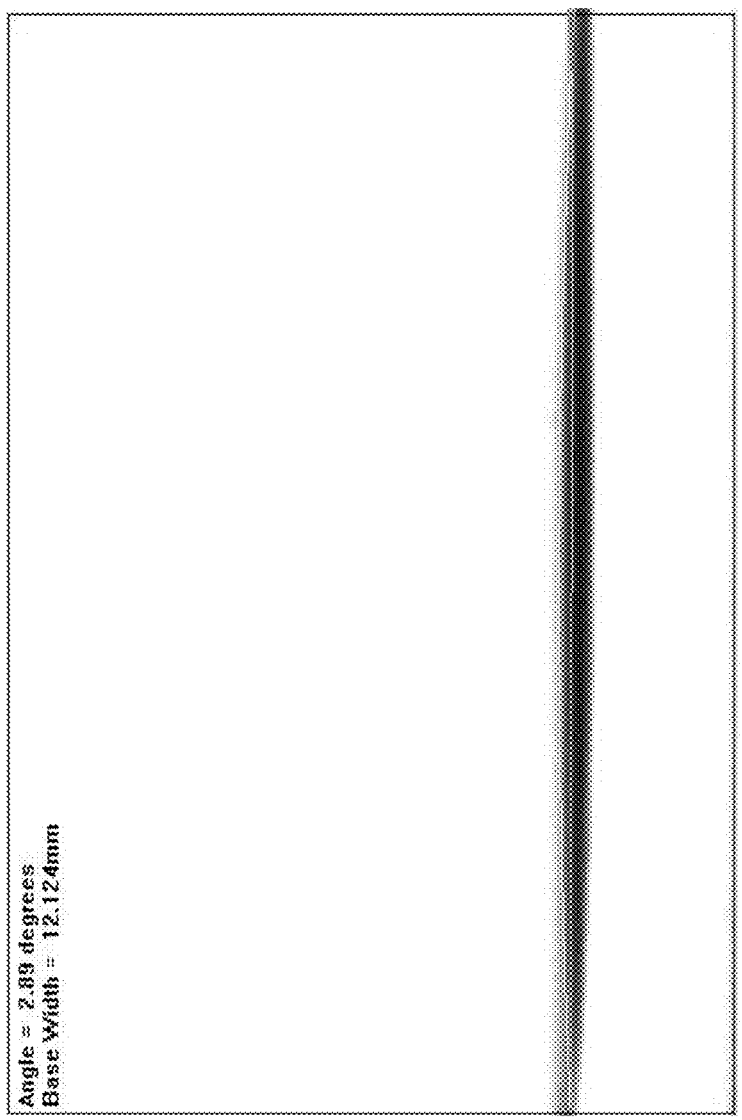
FIG. 3B is a photo showing an embodiment of a silicon wafer processed with KOH hydrophilic treatment in accordance with the present disclosure.
Figure 3C:
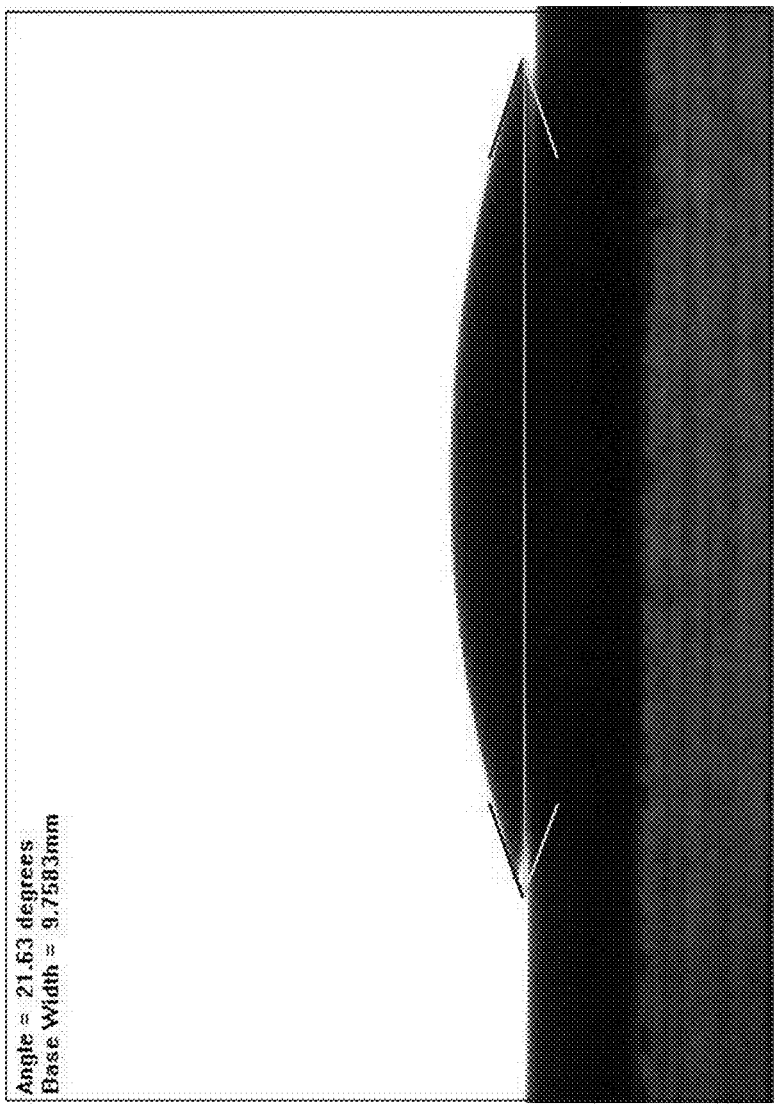
FIG. 3C is a photo showing an embodiment of silicon wafer reacted with GPTMS by 2 hours in accordance with the present disclosure.
Figure 3D:
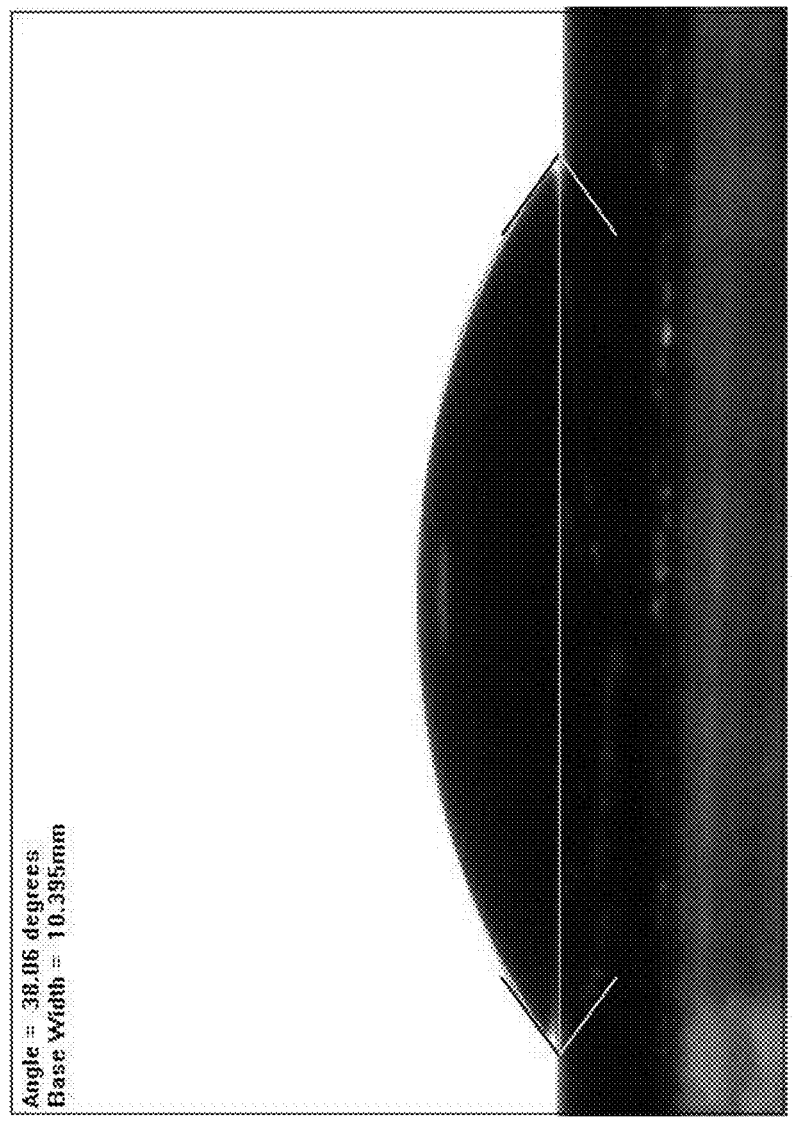
FIG. 3D is a photo showing an embodiment of silicon wafer reacted with GPTMS by 3 hour in accordance with the present disclosure.
Figure 3E:
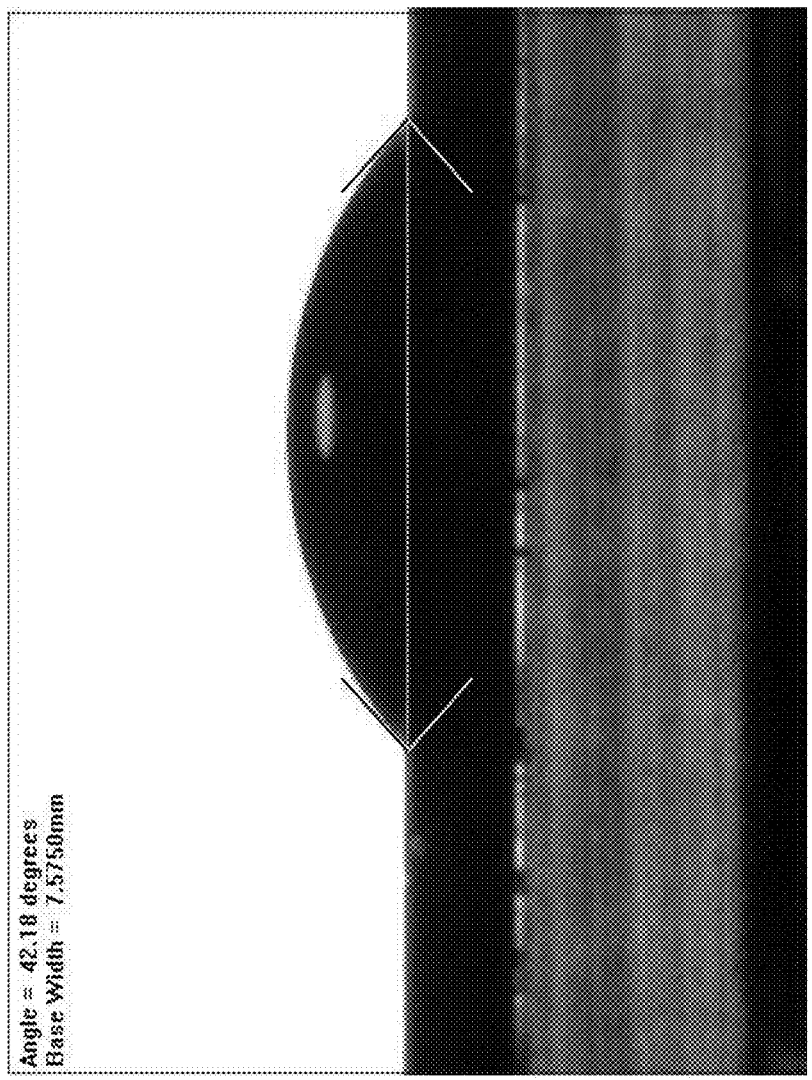
FIG. 3E is a photo showing an embodiment of silicon wafer reacted with GPTMS by 4 hours in accordance with the present disclosure.

Please refer to FIGS. 3A through 3E, which are the photos of an embodiment of the silicon wafer in accordance with the present disclosure. The reason the silicon wafer is used to instead of the glass fiber in this assay is that the glass fiber is too soft to be analyzed for detecting the contact angle, so that the silicon wafer which has identical composition to glass fiber is selected as a replacement. Here, the silicon wafer shown in FIG. 3A is unprocessed and has a contact angle of 28°. The silicon wafer in FIG. 3B is processed with hydrophilic treatment through the KOH solution and has a contact angle of 3°. The silicon wafer shown in FIG. 3C reacts with the GPTMS by 2 hours and has a contact angle of 22°. The silicon wafer shown in FIG. 3D reacts with the GPTMS by 3 hours and has a contact angle of 38°. The silicon wafer shown in FIG. 3E reacts with the GPTMS by 4 hours and has a contact angle of 42°.

According to the results derived from the processes mentioned above, it can be found that the silicon wafer processed with hydrophilic treatment through the KOH solution has a contact angle from 28° to 3°, proving that the hydrophilic treatment processed with the KOH solution does have hydrophilic effect. When the silicon wafer processed with hydrophilic treatment reacts with the GPTMS, the contact angle varies with time from 3° to 42°. Therefore, it can be found that the GPTMS is successfully disposed on the silicon wafer, achieving the effect of modifying the surface of the silicon wafer.

Figure 4A:
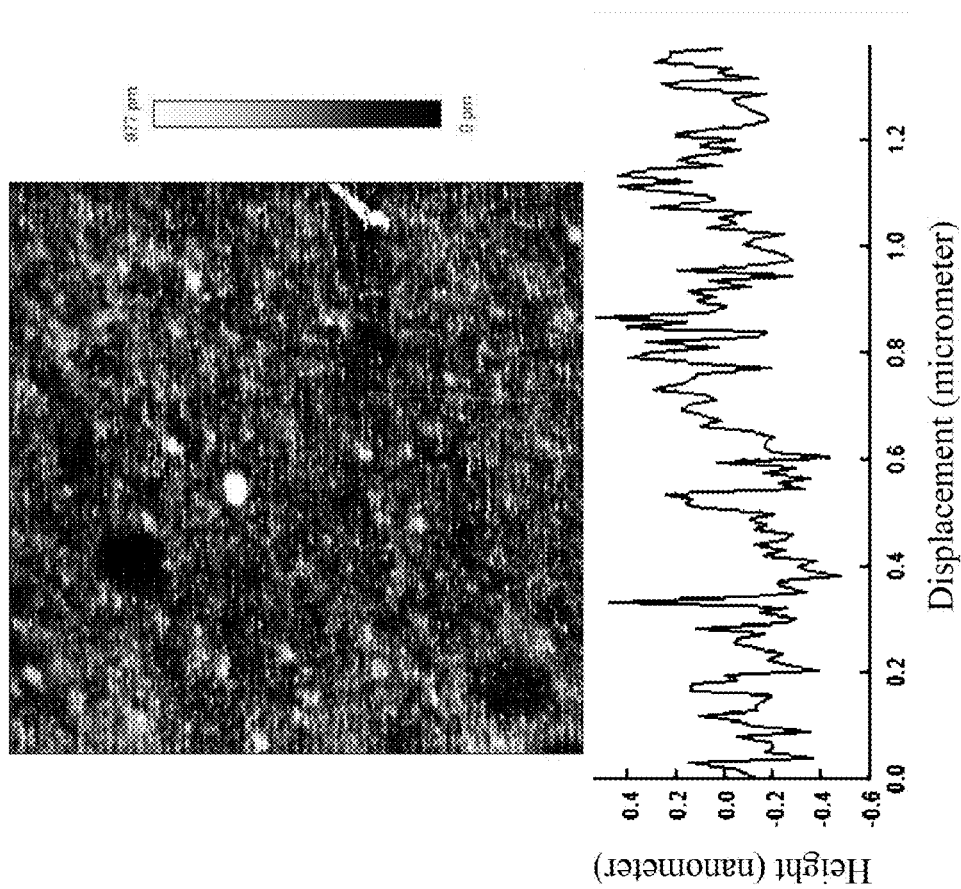
FIG. 4A is a top view of a structural model of AFM surface of an embodiment of silicon wafer in accordance with the present disclosure.
Figure 4B:
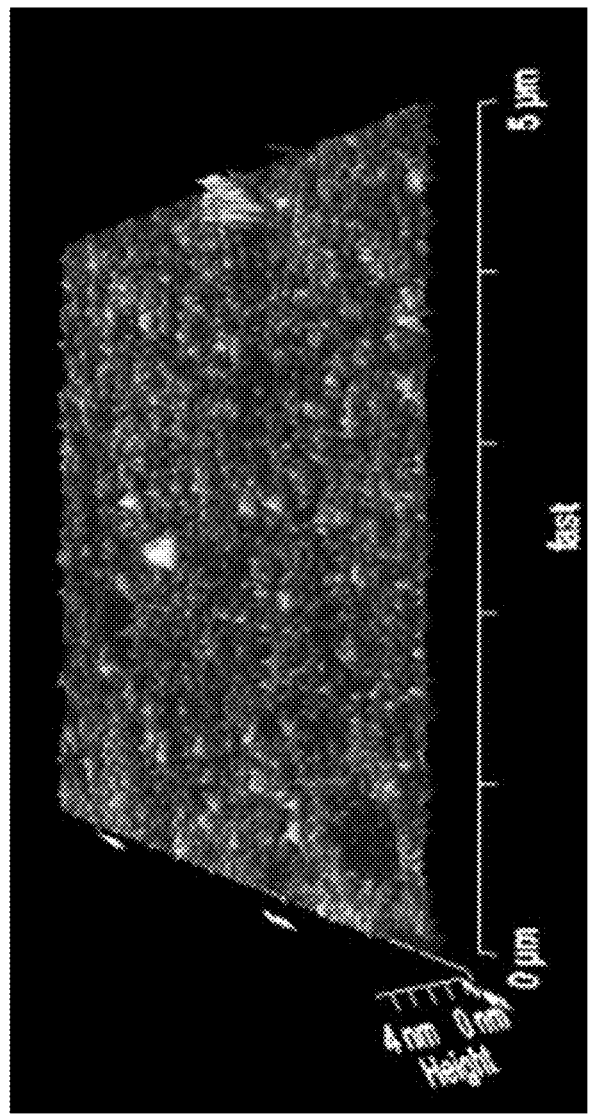
FIG. 4B is a side view of a structural model of AFM surface of an embodiment of silicon wafer in accordance with the present disclosure.

Please refer to FIG. 4A and FIG. 4B, which are the top view and side view of structural model of AFM surface of the silicon wafer, respectively. The reason the silicon wafer is used to instead of the glass fiber in this assay is that the glass fiber is too soft to be analyzed by AFM, so that the silicon wafer which has identical composition to glass fiber is selected as a replacement. Here, the silicon wafers respectively shown in FIGS. 4A and 4B are both processed with hydrophilic treatment and then react with the GPTMS by 3 hours.

According to the aforementioned figures it can be found that surfaces of silicon wafers have a maximum loss by 1 nm, indicating that the GPTMS is evenly disposed on the silicon wafers to form the film of a nano size after the reaction.

Figure 5:
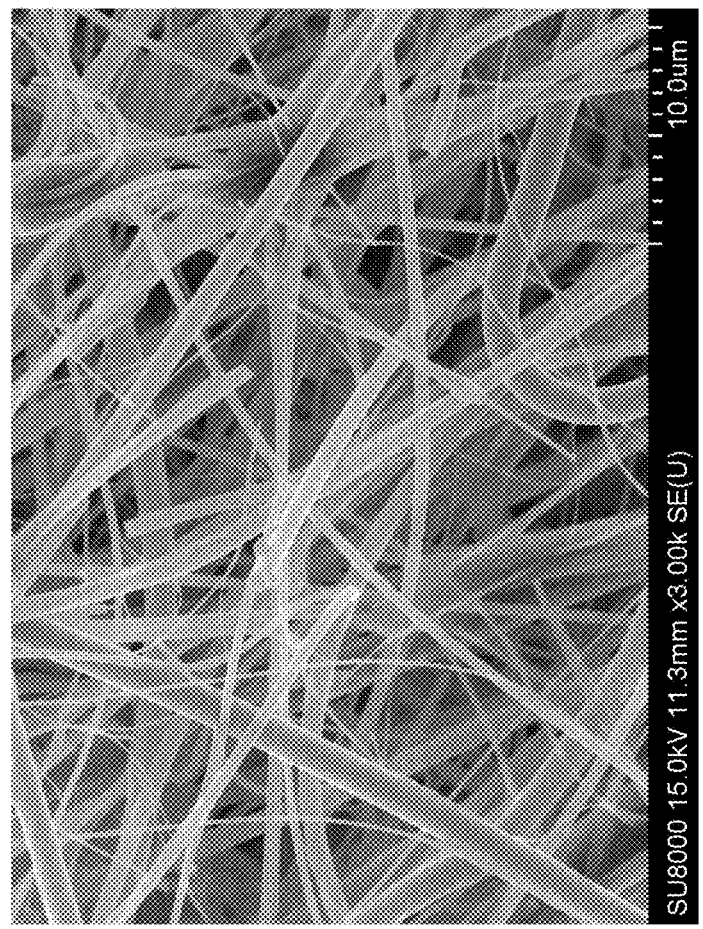
FIG. 5 is a SEM photo showing an embodiment of a substrate of a proton exchange membrane processed with hydrophilic treatment in accordance with the present disclosure.

Please refer to FIG. 5, which is the SEM photo showing an embodiment the substrate of the proton exchange membrane processed with hydrophilic treatment in accordance with the present disclosure. In the present embodiment, the substrate may include glass fiber, and hydrophilic treatment may be performed by KOH solution, but it shall be not limited thereto. Here, by means of hydrophilic treatment, the glass fiber has hydroxyl groups and is further combined with the GPTMS, enabling the GPTMS to be disposed on the glass fiber.

Figure 6:
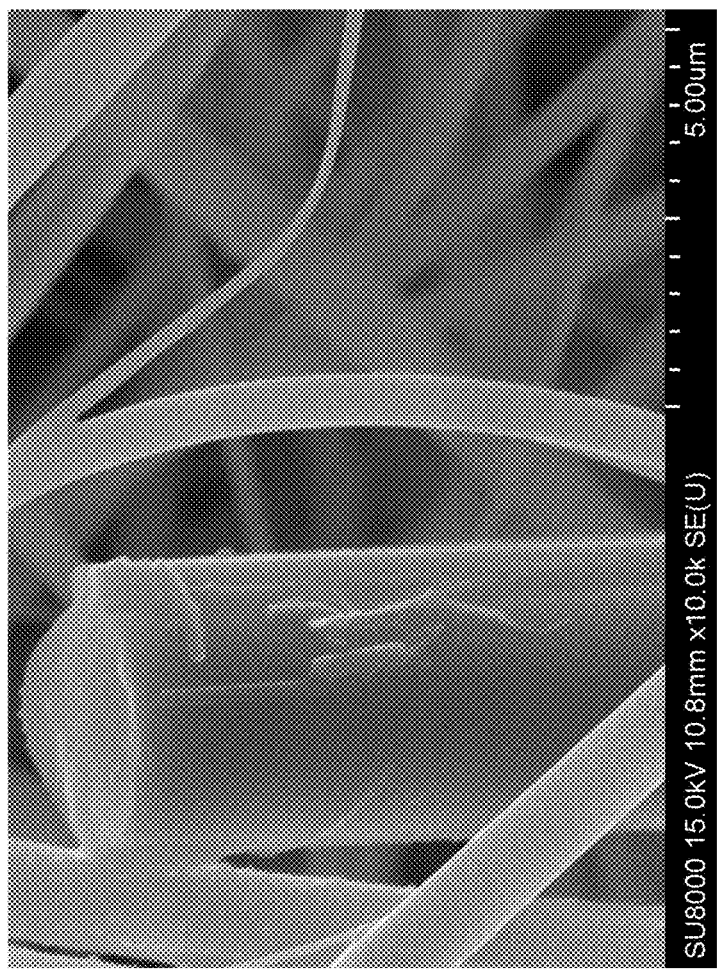
FIG. 6 is a SEM photo showing an embodiment of a substrate of a proton exchange membrane modified by GPTMS in accordance with the present disclosure.

Please refer to FIG. 6, which is the SEM photo showing an embodiment of the substrate of the proton exchange membrane processed with the GPTMS in accordance with the present disclosure. In the present embodiment, the substrate may include glass fiber, but it shall be not limited thereto. Comparing FIG. 6 with FIG. 5 can find a minor difference. However, as the two figures are both of a nano size, it proves that the GPTMS is disposed on the glass fiber with a nano size.

Figure 7A:
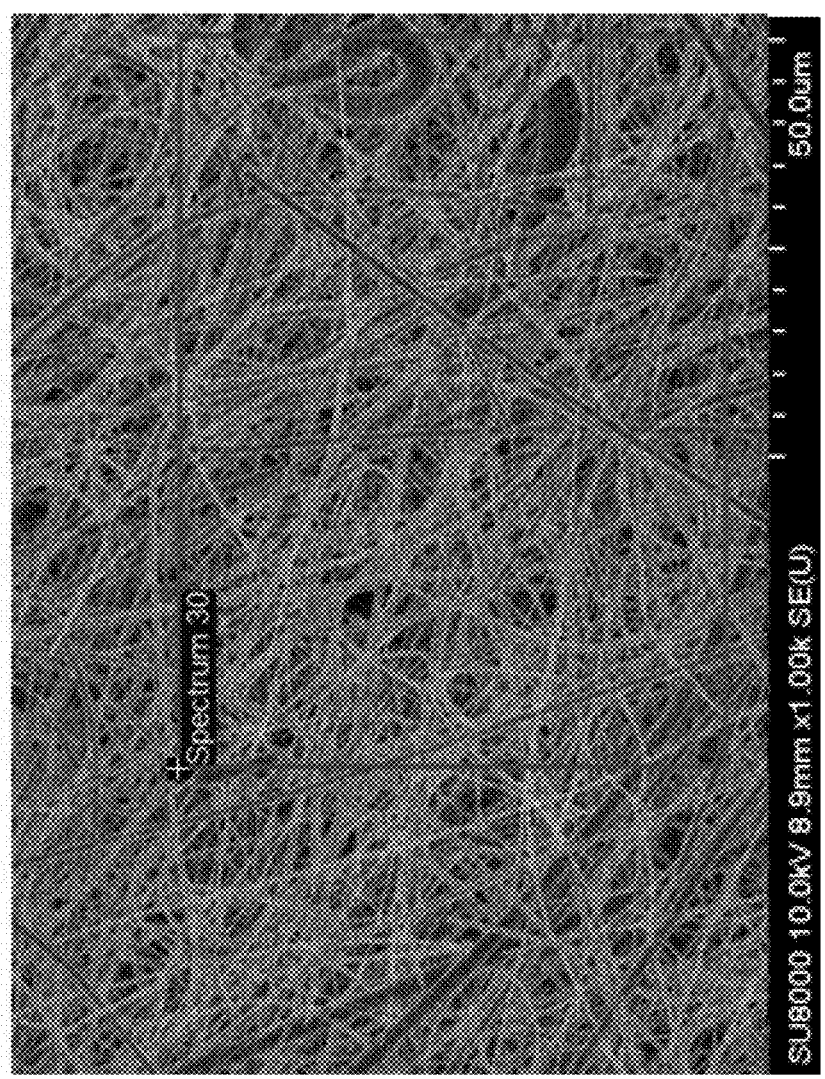
FIG. 7A is a SEM photo showing another embodiment of a substrate of a proton exchange membrane modified by GPTMS in accordance with the present disclosure.
Figure 7B:
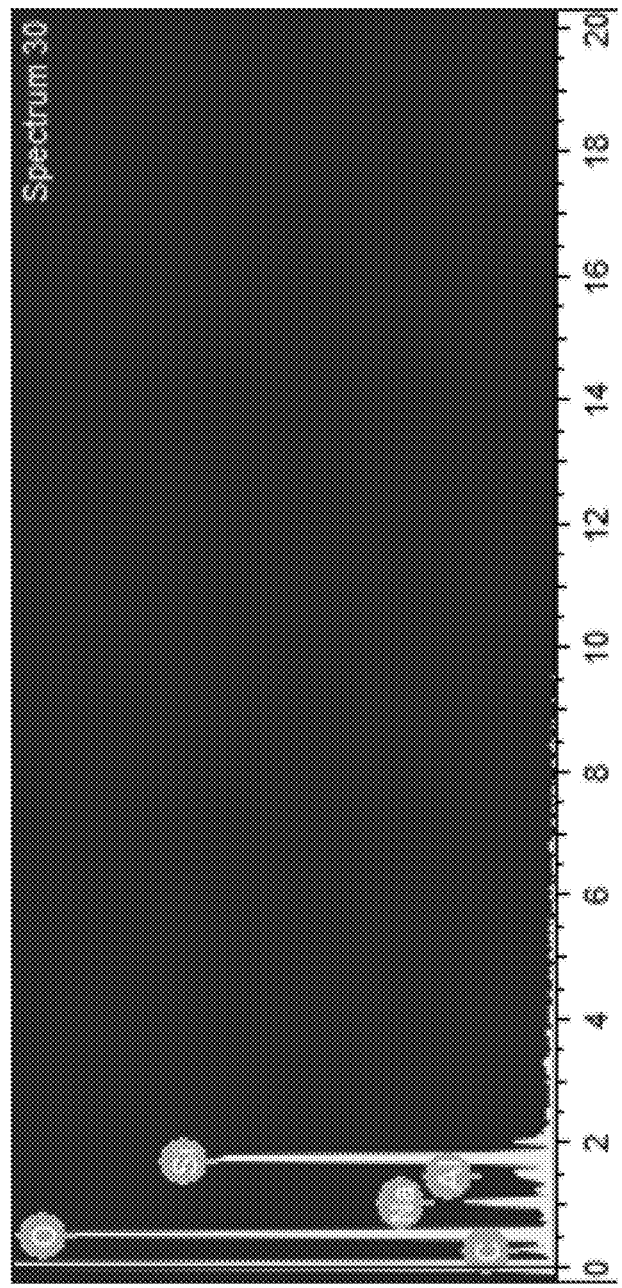
FIG. 7B is an EDX chemical analytical diagram of FIG. 7A.

Please refer to FIGS. 7A and 7B, which are respectively a SEM photo and an EDX chemical constitution analytical diagram showing another embodiment of the substrate of the proton exchange membrane modified by the GPTMS in accordance with the present disclosure. In the embodiment, the substrate may include glass fiber, but it shall be not limited thereto. The EDX chemical constitution of FIG. 7B is shown in table 1.

TABLE 1

| Element | Weight (%) | Atomic (%) |
| --- | --- | --- |
| C | 11.14 | 15.94 |
| O | 62.42 | 67.07 |
| Na | 5.64 | 4.22 |
| Al | 1.60 | 1.02 |
| Si | 19.20 | 11.75 |
| Totals | 100.00 | 100.00 |

As the table shows, the glass fiber without C atom has a weight percent of about 11% and an atom percentage of about 16%. The performance of the GPTMS containing C atom disposed on the glass fiber is therefore found. As a result, the data indicates that the GPTMS is successfully disposed on the glass fiber.

Figure 8A:
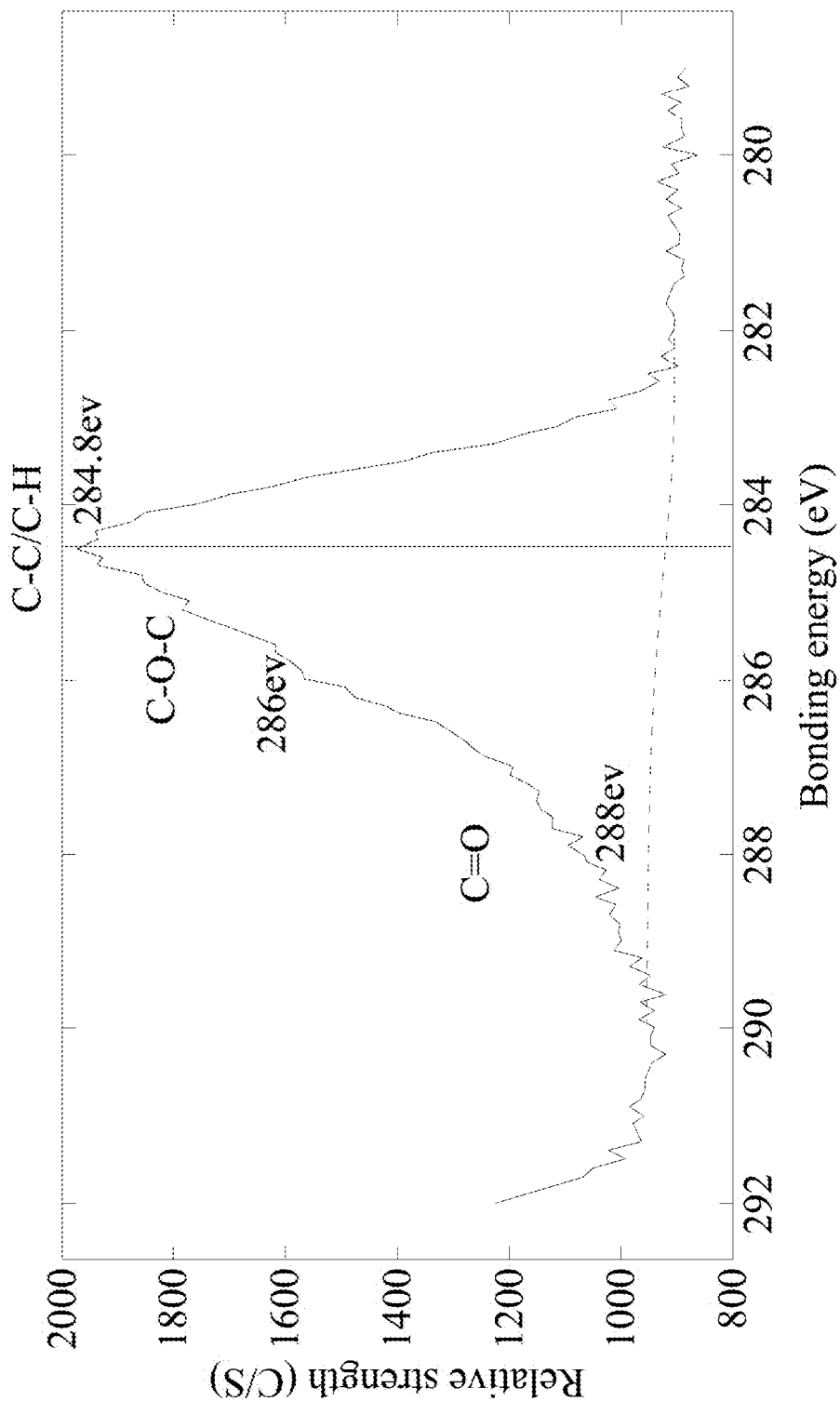
FIG. 8A is a XPS result diagram illustrating an embodiment of a substrate of a proton exchange membrane processed with hydrophilic treatment in accordance with the present disclosure.
Figure 8B:
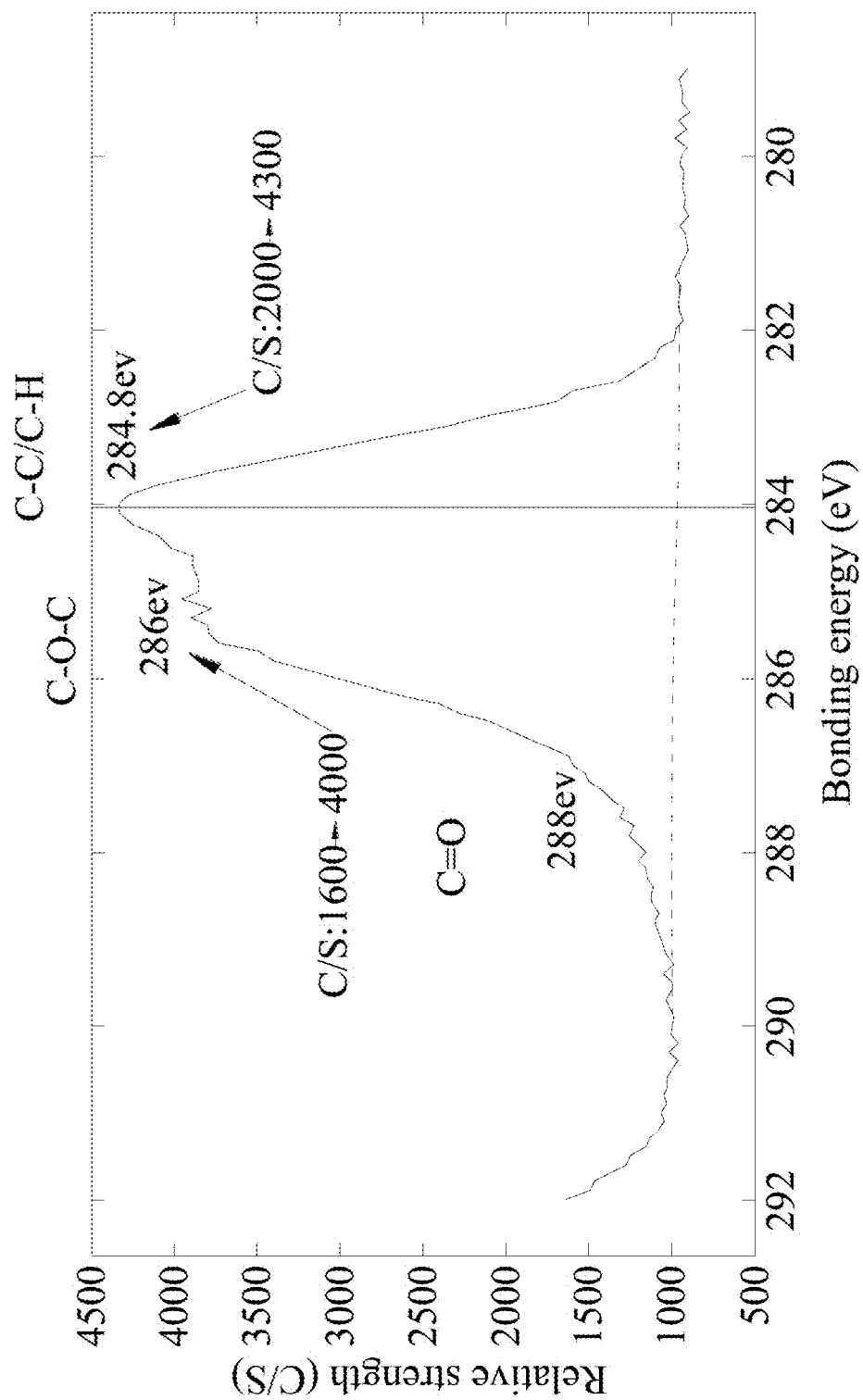
FIG. 8B is a XPS result diagram illustrating an embodiment of a substrate of a proton exchange membrane modified by GPTMS in accordance with the present disclosure.

Please refer to FIG. 8A and FIG. 8B, which are respectively a XPS diagram of the substrate processed with hydrophilic treatment and a XPS diagram of the substrate modified by the GPTMS. In the present embodiment, the substrate may include glass fiber, but it shall be not limited thereto. As shown in the figures, after being modified by the GPTMS, the relative strength of C—C bond and C—H bond increases from 2000 C/S as shown in FIG. 8A to 4300 C/S as shown in FIG. 8B, and the relative strength of C—H—C bond increases from 1600 C/S as shown in FIG. 8A to 4000 C/S as shown in FIG. 8B.

As the data shows, after the glass fiber is modified by the GPTMS, the relative strength of C—C bond, C—H bond and C—H—C bond of the GPTMS increases, meaning that the bonding number increases. Hence, it proves that the GPTMS is indeed disposed on the glass fiber.

Figure 9A:
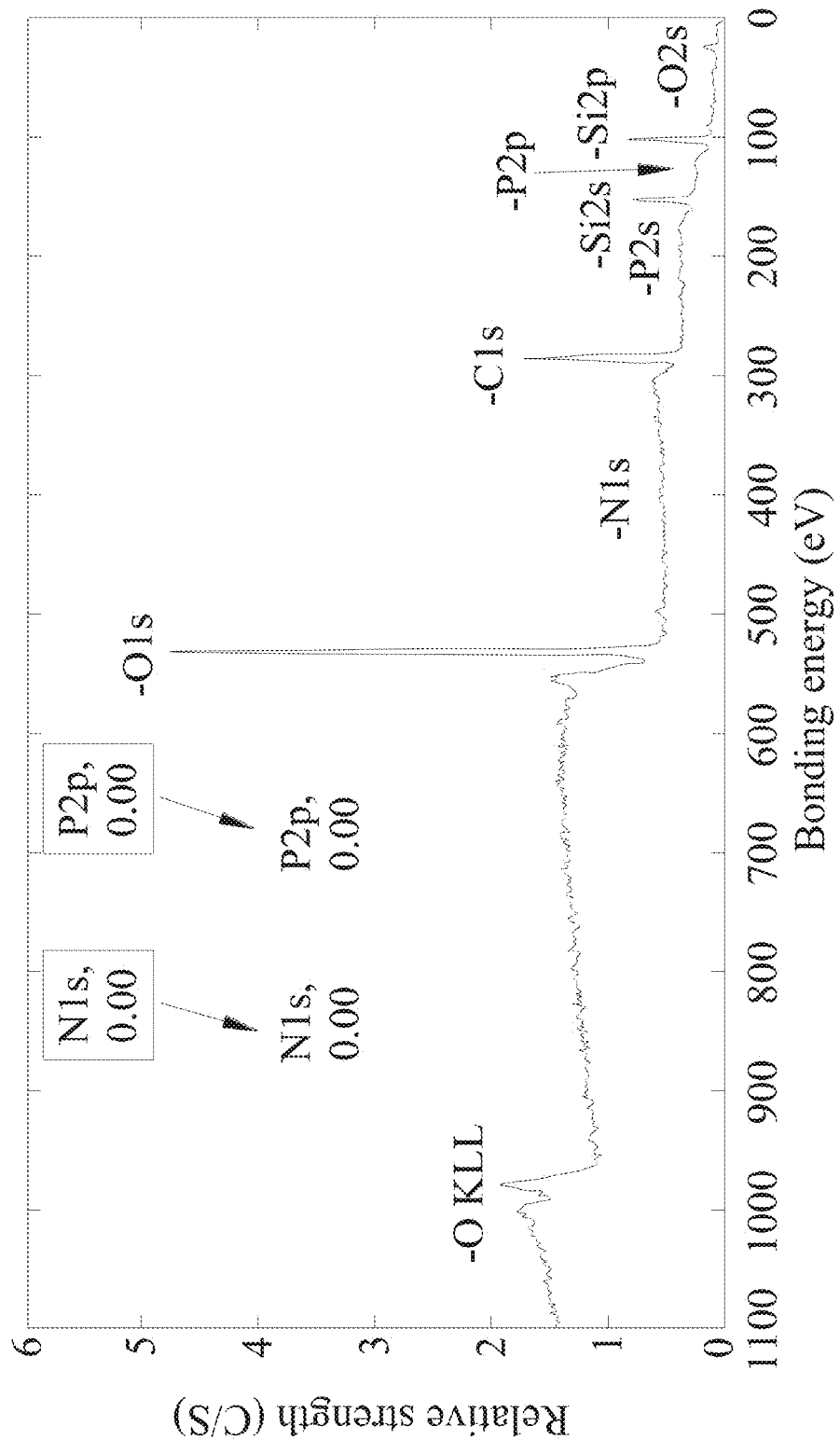
FIG. 9A is a XPS result diagram illustrating an embodiment of a substrate of a proton exchange membrane modified by GPTMS in accordance with the present disclosure.
Figure 9B:
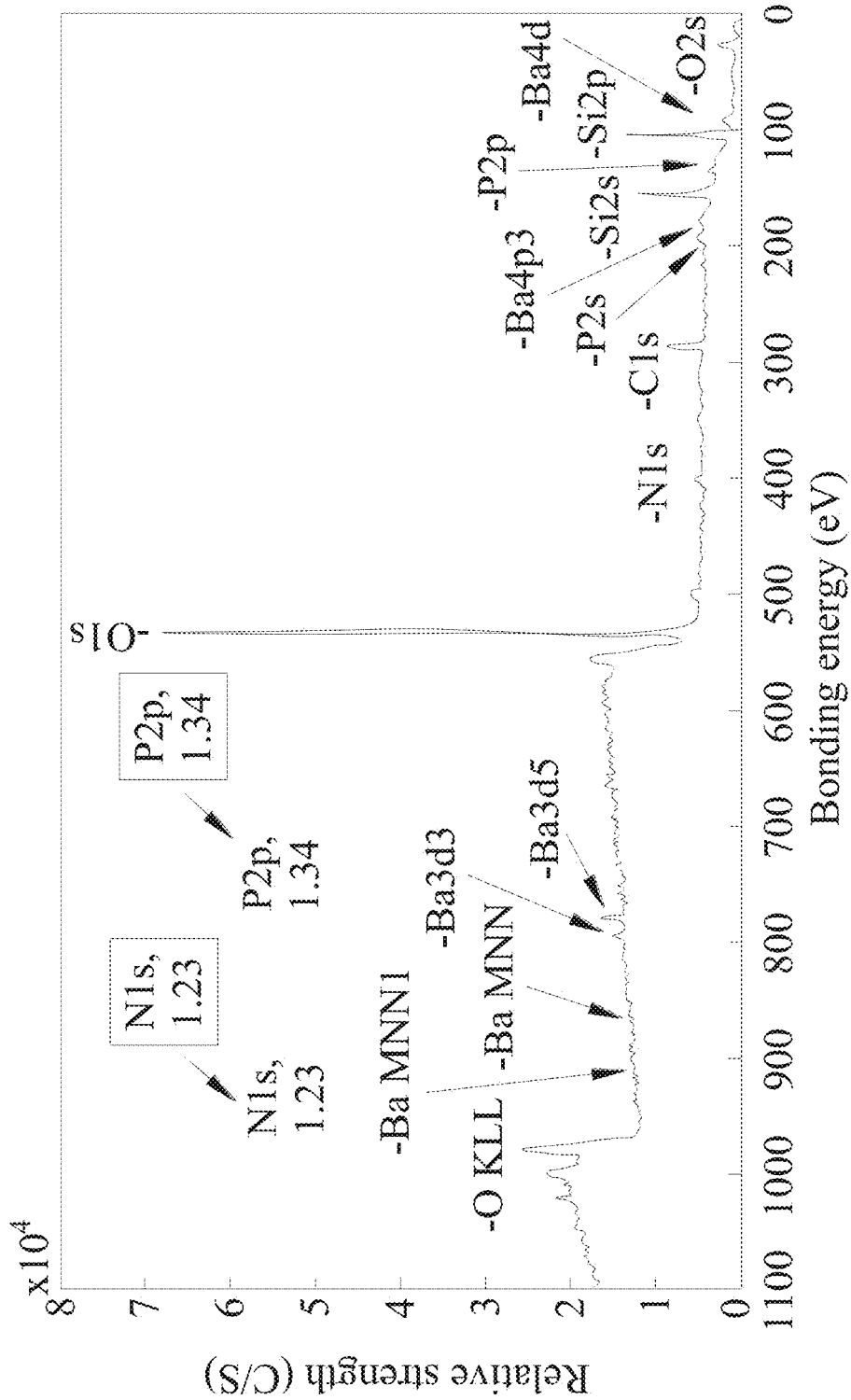
FIG. 9B is a XPS result diagram illustrating an embodiment of a substrate of a proton exchange membrane exposed to an amino acid with a phosphonate radical after ring-opening and grafting reaction in accordance with the present disclosure.

Please refer to FIG. 9A and FIG. 9B, which are respectively a XPS diagram of the substrate of the proton exchange membrane modified by the GPTMS and a XPS diagram showing the ring-opening and grafting reaction of the substrate containing phosphonate radicals. In the present embodiment, the substrate may include glass fiber and the amino acid with a phosphonate radical may include O-phospho-DL-serine, but it shall be not limited thereto. As shown in the figures, after the ring-opening and grafting reaction, the relative strength of nitrogen element increases from 0 C/S as shown in FIG. 9A to 1.23 C/S as shown in FIG. 9B, and the relative strength of phosphor element increases from 0 C/S as shown in FIG. 9A to 1.34 C/S as shown in FIG. 9B.

As the data shows, after the ring-opening and grafting reaction, the relative strength of nitrogen element and phosphor element of O-phospho-DL-serine increase from 0 as shown in FIG. 9A to a certain strength as shown in FIG. 9B. Hence, it shows that the GPTMS is indeed disposed on the glass fiber.

Figure 10:
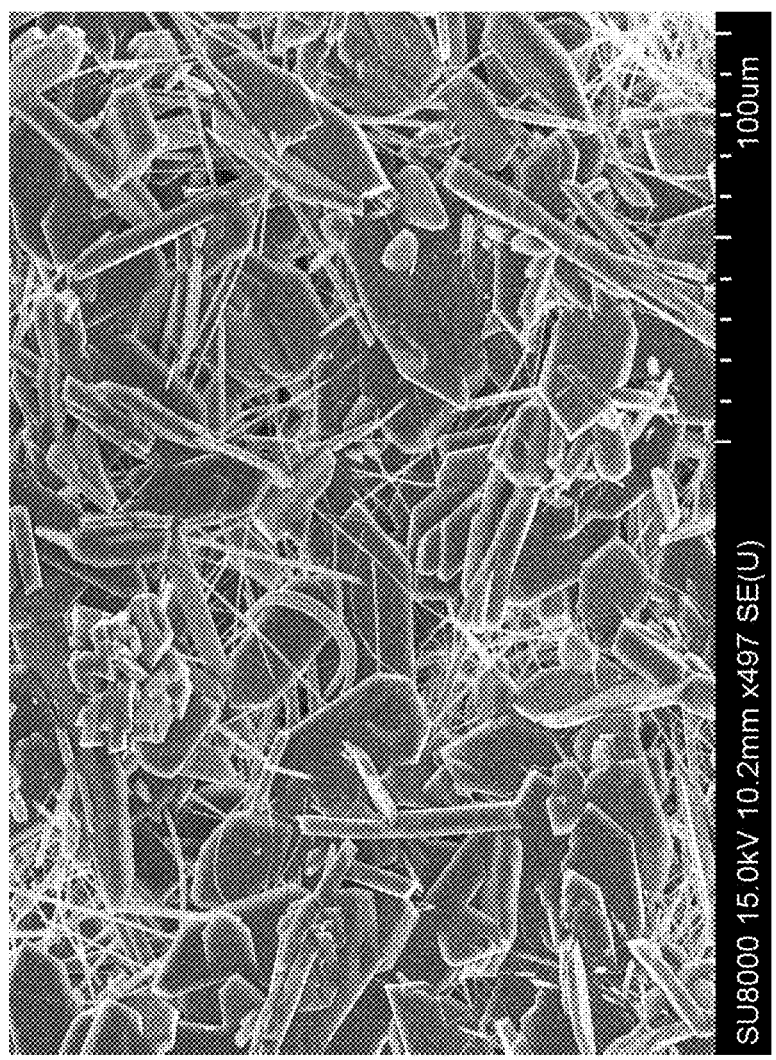
FIG. 10 is a SEM photo showing an embodiment of a substrate of a proton exchange membrane exposed to an amino acid with a phosphonate radical after ring-opening and grafting reaction in accordance with the present disclosure.

Please refer to FIG. 10, which is a SEM photo showing the proton exchange membrane and the substrate exposed to the amino acid with a phosphonate radical after the ring-opening and grafting reaction. In the present embodiment, the substrate may include glass fiber and the amino acid with a phosphonate radical may include O-phospho-DL-serine, but it shall be not limited thereto. The difference between FIG. 5, FIG. 6 and FIG. 10 lies that there are numerous plate-shaped substances of nano size disposed among the glass fibers shown in FIG. 10, compared the substrate processed with hydrophilic treatment shown in FIG. 5 and the substrate modified by the GPTMS shown in FIG. 6. The chemical constitution of the plate-shaped substances will be described in the following paragraphs.

Figure 11A:
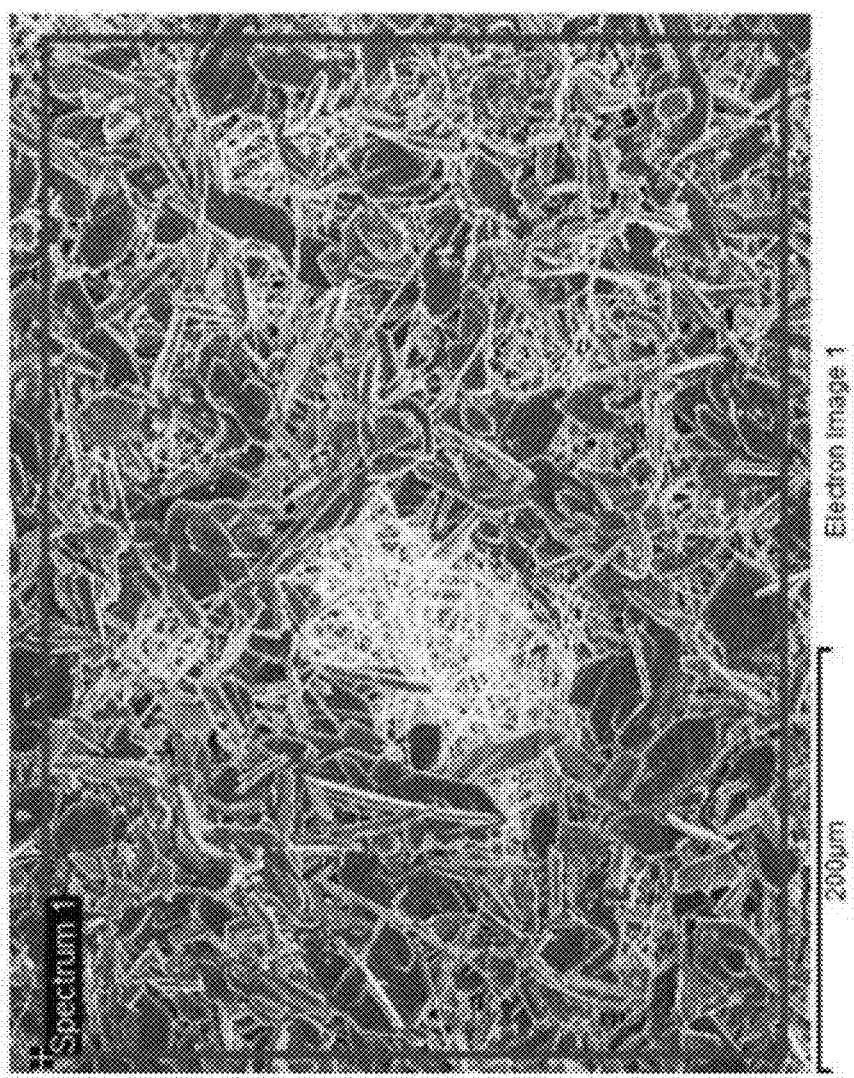
FIG. 11A is a SEM photo showing an embodiment of a substrate of a proton exchange membrane exposed to an amino acid with a phosphonate radical after ring-opening and grafting reaction in accordance with the present disclosure.
Figure 11B:
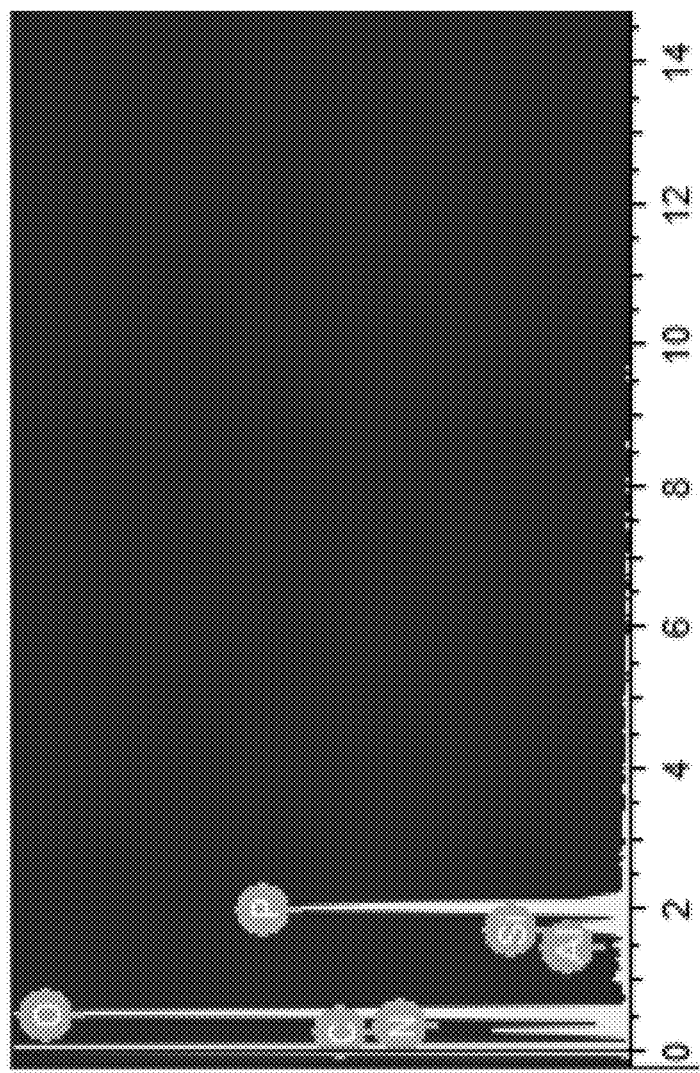
FIG. 11B is an EDX chemical constitution analytical diagram of large block shown in FIG. 11A.

Please refer to FIG. 11A and FIG. 11B, which are respectively a SEM photo showing the substrate of the proton exchange membrane exposed to the amino acid with a phosphonate radical after ring-opening and grafting reaction and an analytical diagram of EXD chemical constitution thereof. In the present embodiment, the substrate may include glass fiber and the amino acid with a phosphonate radical may include O-phospho-DL-serine, but it shall be not limited thereto. The EDX chemical constitution of FIG. 11B is shown in table 2.

TABLE 2

| Element | Weight (%) | Atomic (%) |
|---------|------------|------------|
| C       | 22.96      | 30.33      |
| N       | 3.95       | 4.48       |
| O       | 57.62      | 57.14      |
| Al      | 0.28       | 0.17       |
| Si      | 2.02       | 1.14       |
| P       | 13.16      | 6.74       |
| Totals  | 99.99      | 100        |

Compared with table 1 it can be found that the carbon element is not present in O-phospho-DL-serine before the ring-opening and grafting reaction, while it has a weight percentage of about 13% and an atom percentage of about 7% after the reaction. As a result, the data indicates that the O-phospho-DL-serine is successfully bonded on the glass fiber.

Figure 12A:
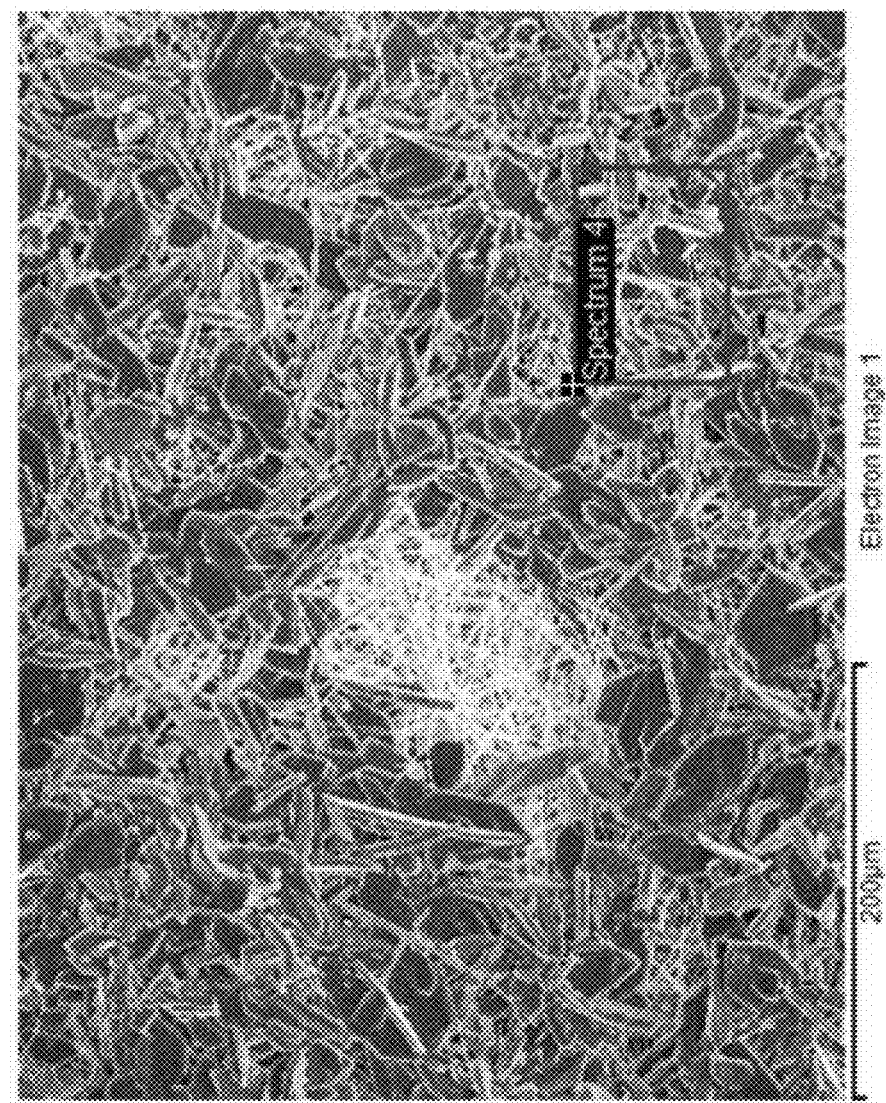
FIG. 12A is a SEM photo showing an embodiment of a substrate of a proton exchange membrane exposed to an amino acid with a phosphonate radical after ring-opening and grafting reaction in accordance with the present disclosure.
Figure 12B:
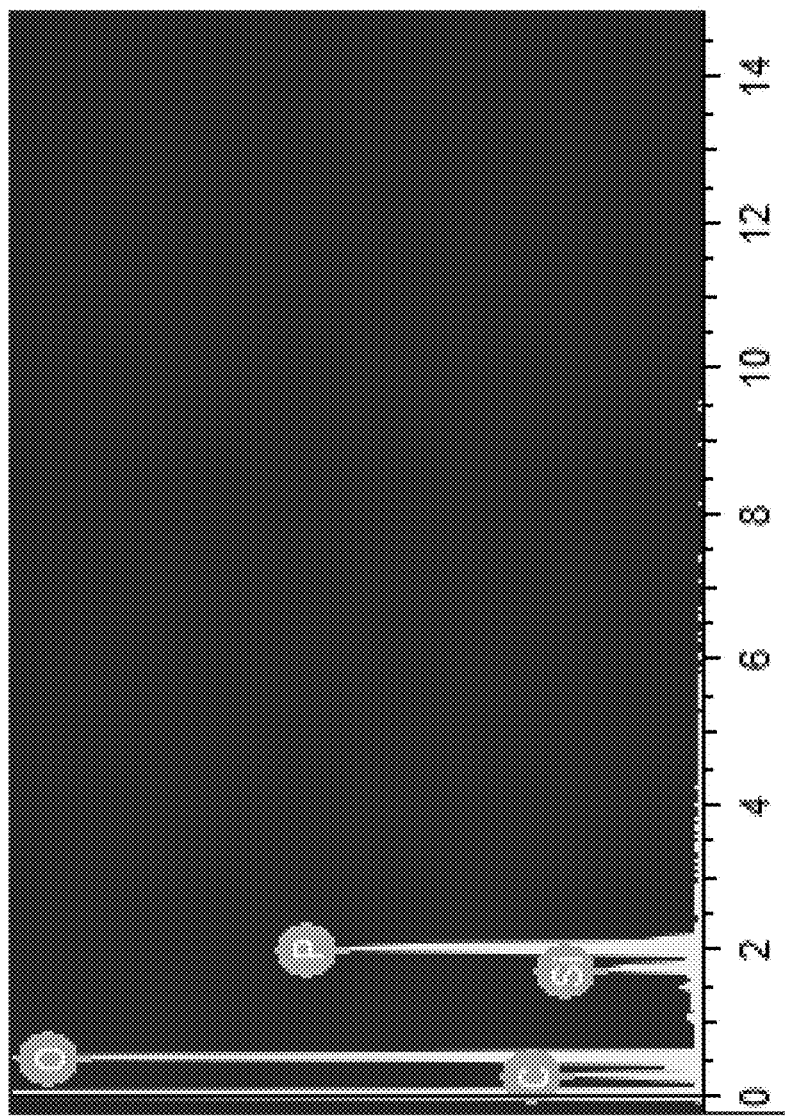
FIG. 12B is an EDX chemical constitution analytical diagram of the plates shown in FIG. 12A.

Please refer to FIG. 12A and FIG. 12B, which are respectively a SEM photo showing the substrate of the proton exchange membrane exposed to the amino acid with a phosphonate radical after ring-opening and grafting reaction and an analytical diagram of EXD chemical constitution thereof. In the present embodiment, the substrate may include glass fiber and the amino acid with a phosphonate radical include O-phospho-DL-serine, but it shall be not limited thereto. The EDX chemical constitution of FIG. 12B is shown in table 3.

TABLE 3

| Element | Weight (%) | Atomic (%) |
|---------|------------|------------|
| C       | 24.27      | 32.32      |
| O       | 58.86      | 58.84      |
| Si      | 2.63       | 1.50       |
| P       | 14.23      | 7.35       |
| Totals  | 99.99      | 100.01     |

As the data shows, the P element, which is derived from the plate in SEM photo, shown in table 3 has a higher weight percentage of about 1% and a higher atomic percentage of about 0.6% than that in table 2. Hence, it can be found that the plates are the main place where O-phospho-DL-serine reacts with glass fiber.

Figure 13:
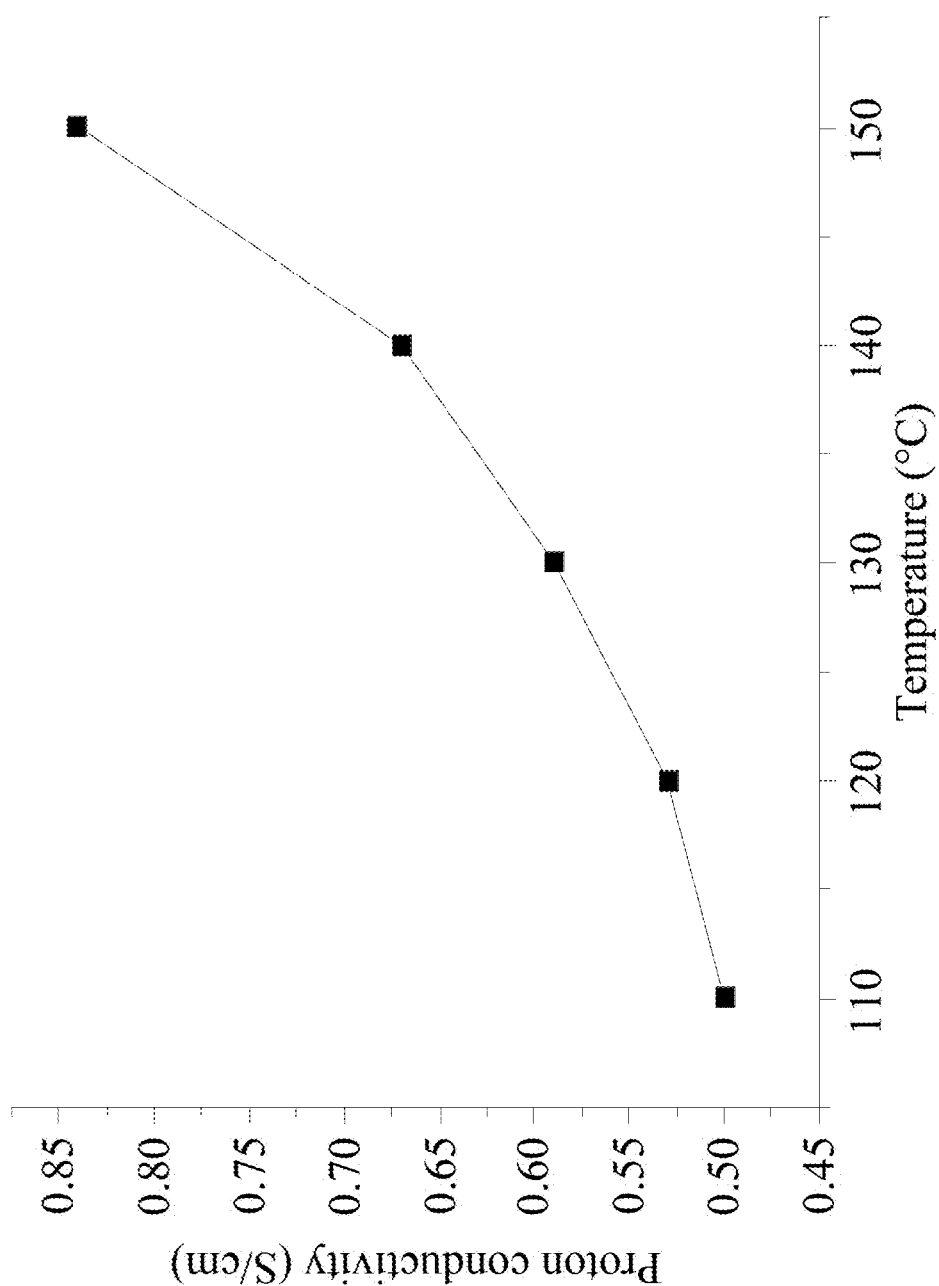
FIG. 13 is a schematic diagram illustrating an embodiment of the proton conductivity of a proton exchange membrane varying with temperatures in accordance with the present disclosure.

Please refer to FIG. 13, which is a schematic diagram illustrating an embodiment of the proton conductivity of a proton exchange membrane varying with temperatures in accordance with FIG. 1 of the present disclosure. As shown in the figure, the proton exchange membrane of the present embodiment has better proton conductivity, and the proton conductivity reaches to 0.84 S/cm at a temperature of 150° C. Here, the AC impedance analysis is applied to measure the proton conductivity.

Figure 14:
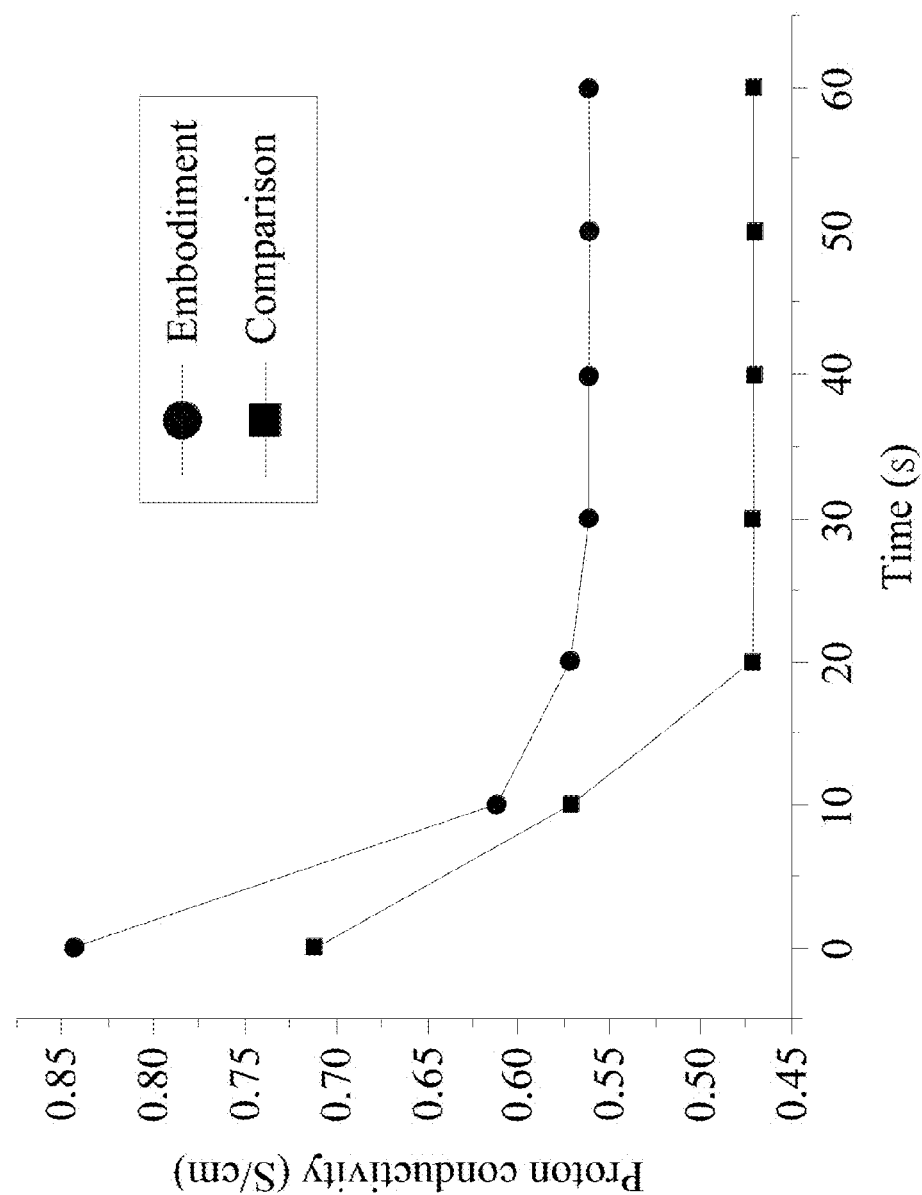
FIG. 14 is a schematic diagram illustrating a comparison and an embodiment of a proton exchange membrane in accordance with the present disclosure.

FIG. 14 is a schematic diagram illustrating a comparison and an embodiment of a proton exchange membrane in accordance with the present disclosure. As shown in the figure, the proton conductivity of the proton exchange membrane of an embodiment and that of the comparison are measured in one minute. Here, the composition of the proton exchange membrane of the comparison is PTFE, phosphoric acid, and glass fiber processed with hydrophilic treatment. The hydrophilic treatment may include KOH immersion treatment, hydro plasma treatment or methanol immersion treatment, but it shall be not limited thereto. The proton exchange membrane of the embodiment is formed according to the process shown in FIG. 1. The detailed data of FIG. 14 is shown in table 4.

TABLE 4

| | Types of the proton exchange membranes | |
|---|---|---|
| Test types | Embodiment | Comparison |
| Proton conductivity (S/cm) | 0.83 | 0.71 |
| Proton conductivity after 1 min (S/cm) | 0.56 | 0.46 |
| Decrease of Proton conductivity after 1 min | 32% | 35% |

According to the result shown in table 4 it can be found that the proton conductivity of the proton exchange membrane of the embodiment after 1 minute is 32%, and the decrease of proton conductivity of the proton exchange membrane of the comparison after 1 minute is 35%. The degree of attenuation is 3%, meaning that the proton conductivity of the proton exchange membrane of the embodiment has a smaller decrease. In other words, the proton conductivity of the proton exchange membrane of the embodiment has a better capacity for retaining the phosphoric acid after a period of time. In addition, the initial proton conductivity of the proton exchange membrane of the embodiment is better than that of the comparison, indicating that the proton exchange membrane of the embodiment is able to retain more phosphoric acids which are served as proton conductor, so as to further promote the electrical efficiency of the fuel cell.

Figure 15A:
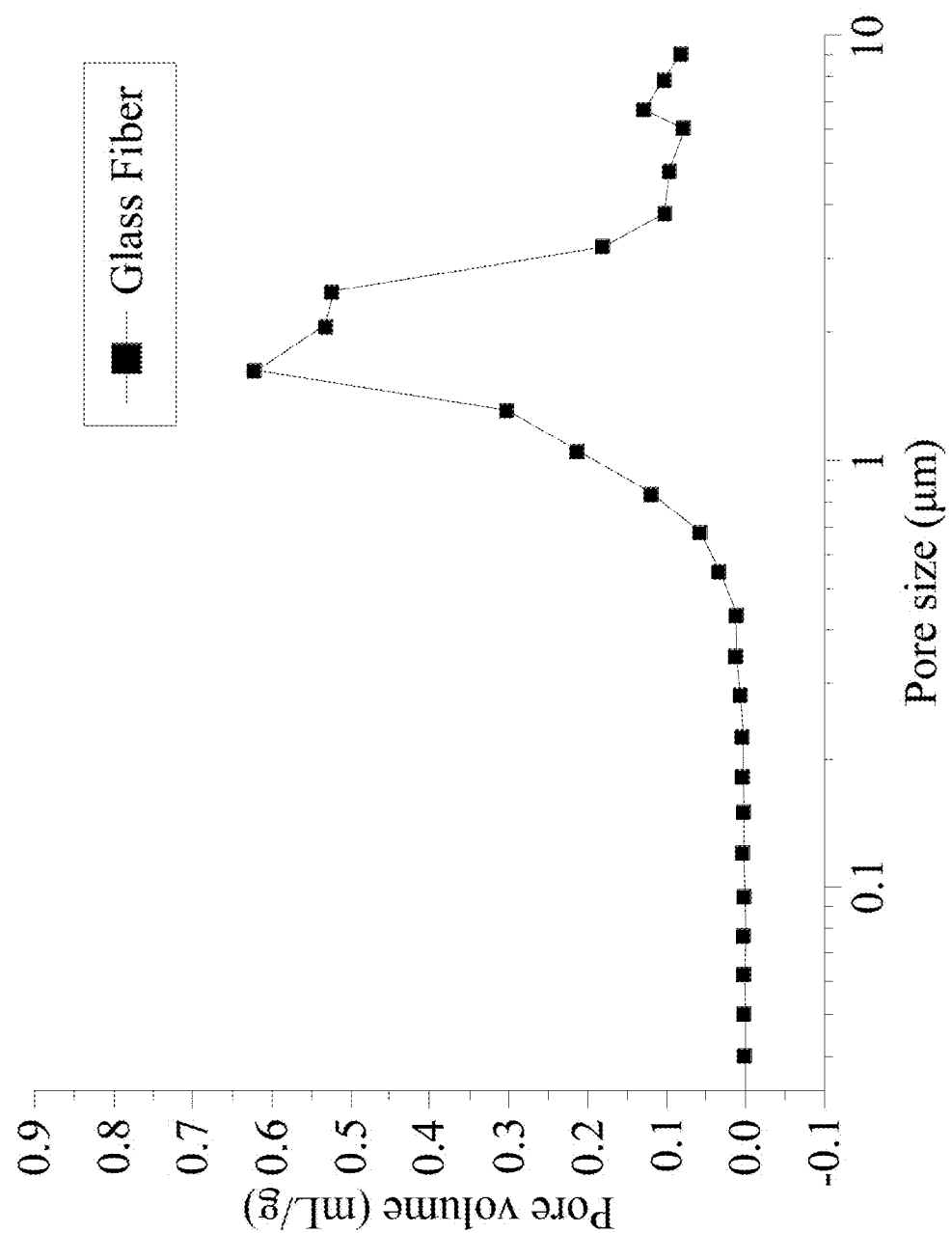
FIG. 15A is a schematic diagram illustrating an embodiment of the pore distribution of the glass fiber.
Figure 15B:
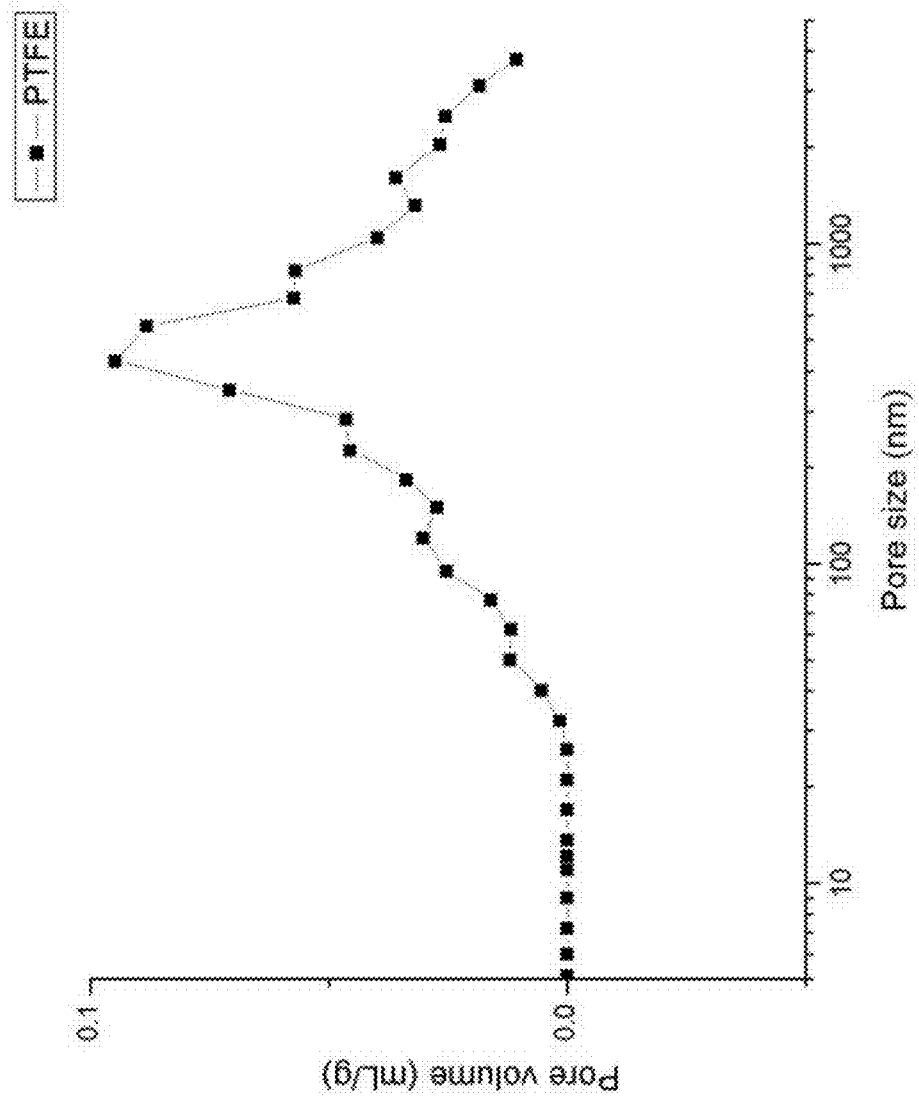
FIG. 15B is schematic diagram illustrating an embodiment of the pore distribution of the PTFE film.

Please refer to FIGS. 15A and 15B, which are schematic diagrams illustrating an embodiment of the pore distribution of the glass fiber and the PTFE film, respectively. As shown in the figure, the pore distribution of the glass fiber is about 1 μm to about 1.5 μm, and the pore distribution of the PTFE film is about 50 nm to about 400 nm. In addition, the porosity of the glass fiber is about 93%, and the porosity of the PTFE film is about 70%. The above data were all measured by the mercury porosimeter. The difference of the pore size and the porosity between the substrate (e.g. the glass fiber) and the leak-proof film (e.g. the PTFE film) may facilitate to retain the phosphoric acid in the proton exchange membrane.

In conclusion, after the modified processes, the proton exchange membrane of the present disclosure is able to retain the phosphoric acid in organic/inorganic complex form and micron/nano complex pore size. Compared with the traditional proton exchange membrane which retains the phosphoric acid in inorganic form, the proton exchange membrane of the present disclosure has better proton conductivity and the proton conductivity can be maintained after a period of time, so that the electrical efficiency of fuel cell can be promoted completely. In addition, the contact angle, AFM, SEM, EDX and XPS are applied to validate the modification of the present disclosure, indicating that parameters such as contact angles, photos, chemical constitutions, bonding, and the relative strength of atoms, and so on all successfully achieve the desired effect after being modified.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:

1. A method of manufacturing a proton exchange membrane, comprising the following steps of:
    disposing hydroxyl groups on a surface of a substrate by a hydrophilic treatment;
    chemically modifying the hydroxyl groups disposed on the substrate with a coupling agent by a sol-gel process;
    chemically bonding an amino acid containing a phosphonate radical with the coupling agent chemically modifying the substrate;
    making the substrate which is chemically bonded to absorb phosphoric acid; and
    placing the substrate blended with the phosphoric acid between at least two leak-proof films for preventing the leakage of the absorbed phosphoric acid,
    wherein the coupling agent comprises (3-glycidyloxypropyl)trimethoxysilane, and the amino acid containing a phosphonate radical comprises O-phospho-DL-serine, O-phospho-L-threonine, O-phospho-L-tyrosine, or N-phosphonomethylglycine.

2. The method of manufacturing the proton exchange membrane of claim 1, wherein the substrate comprises glass fiber, polybenzimidazoles, polyolefin, or polyacrylamide/polyvinyl alcohol.

3. The method of manufacturing the proton exchange membrane of claim 1, wherein the least two leak-proof films comprise a polytetrafluoroethylene film, a graphene oxide, or a polycarbonate membrane.

* * * * *